United States Patent
Kieft et al.

(10) Patent No.: US 10,560,502 B2
(45) Date of Patent: Feb. 11, 2020

(54) METHOD TO RE-SYNCHRONIZE LIVE MEDIA STREAMS, COMMANDS, AND ON-SCREEN EVENTS TRANSMITTED THROUGH DIFFERENT INTERNET PATHWAYS

(71) Applicant: KnowledgeVision Systems Incorporated, Lincoln, MA (US)

(72) Inventors: Alexander J. Kieft, Arlington, MA (US); Joe C. McPherson, Rockwell, NC (US); Michael E. Kolowich, Sudbury, MA (US)

(73) Assignee: OpenExchange, Inc., Boston, MA (US)

( * ) Notice: Subject to any disclaimer, the term of this patent is extended or adjusted under 35 U.S.C. 154(b) by 112 days.

(21) Appl. No.: 15/922,297

(22) Filed: Mar. 15, 2018

(65) Prior Publication Data
US 2019/0068664 A1    Feb. 28, 2019

Related U.S. Application Data

(60) Provisional application No. 62/549,620, filed on Aug. 24, 2017.

(51) Int. Cl.
*H04L 29/06* (2006.01)
(52) U.S. Cl.
CPC ........ *H04L 65/4069* (2013.01); *H04L 65/607* (2013.01); *H04L 65/608* (2013.01)
(58) Field of Classification Search
None
See application file for complete search history.

(56) References Cited

U.S. PATENT DOCUMENTS 60,800,063    6/2000    Khosla
7,823,066 B1    10/2010    Kuramura
(Continued)

OTHER PUBLICATIONS https://www.telestream.net/wirecast/overview.html—Telstra Wirecast "Wirecast—Live video streaming production software for Mac & PC" 10 pages—retrieved from Internet Aug. 17, 2018.
(Continued)

*Primary Examiner* — Philip J Chea
*Assistant Examiner* — Hassan A Khan
(74) *Attorney, Agent, or Firm* — Hamilton, Brook, Smith & Reynolds, P.C.

(57) ABSTRACT

Embodiments of the present invention are directed to computer systems and methods of re-synchronizing playback of a live media stream with execution of a stream of out-of-band commands, where the commands and media stream are transmitted through different network pathways. The systems and methods, at a multimedia player, retrieve a command manifest file from a publishing server or CDN and parse the location of the media stream from the file. The systems and methods load and buffer the media stream from the parsed location and start playback of the media stream. The systems and methods monitor current playback time of the live media stream. The systems and methods also poll the user-initiated commands appended to the command manifest file. The systems and methods determine whether to execute a user-initiated command of the polled user-initiated commands in a user interface of the multimedia player based on the monitored current playback time.

17 Claims, 15 Drawing Sheets

(56) References Cited

U.S. PATENT DOCUMENTS

| | | | |
|---|---|---|---|
| 7,824,268 | B2 | 11/2010 | Harvey et al. |
| 9,042,708 | B2 | 5/2015 | Caldwell et al. |
| 2006/0112325 | A1 | 5/2006 | Ducheneaut et al. |
| 2010/0247082 | A1 | 9/2010 | Caldwell et al. |
| 2011/0083073 | A1 | 4/2011 | Atkins et al. |
| 2014/0379868 | A1 | 12/2014 | Nault |
| 2016/0014477 | A1 | 1/2016 | Siders |
| 2019/0068665 | A1* | 2/2019 | Kieft .................. H04L 65/4069 |

OTHER PUBLICATIONS https://helpx.adobe.com/media-encoder/user-guide.html—Adobe Live Media Encoder "Adobe Media Server Professional" 4 pages—retrieved from Internet Aug. 17, 2018.
https://www.newtek.com/tricaster/—"NewTek TriCaster" 9 pages—retrieved from Internet Aug. 17, 2018.
https://zoom.us/webinar—"Zoom Video Webinar" 3 pages—retrieved from Internet Aug. 17, 2018.
https://www.pexip.com/pexip-infinity-connect—"Pexip Infinity" 5 pages—retrieved from Internet Aug. 17, 2018.
https://www.wowza.com/products/streaming-engine—"Wowza Streaming Engine" 2 pages—retrieved from Internet Aug. 17, 2018.
https://www.adobe.com/products/adobe-media-server-professional.html—"Adobe Media Server" 2 pages—retrieved from Internet Aug. 17, 2018.
https://www.brightcove.com/en/live—"Brightcove Live Streaming Service" 7 pages—retrieved from Internet Aug. 17, 2018.
https://www.brightcove.com/en/zencoder—"Brightcove Zencoder Live Transcoding" 6 pages—retrieved from Internet Aug. 17, 2018.
https://aws.amazon.com/medialive/—"AWS Elemental MediaLive" 6 pages—retrieved from Internet Aug. 17, 2018.
https://www.wowza.com/products/streaming-cloud—"Wowza Streaming Cloud" 6 pages—retrieved from Internet Aug. 17, 2018.
https://www.encoding.com/live/ 6 pages—retrieved from Internet Aug. 20, 2018.
Non-Final Office Action for U.S. Appl. No. 15/922,557 titled "Method to Record and Replay Synchronized Media Streams, Commands, and On-Screen Events Transmitted Through Different Internet Pathways," dated Sep. 30, 2019.

* cited by examiner

Example Command Manifest Data

| Server Timestamp (ms) | Offset Time (ms) | Command Type | Command Parameters |
|---|---|---|---|
| 1519927808000 | 0 | STAND_BY | https://www.path.to/stand_by.json |
| 1519928141000 | 0 | DELAY | https://www.path.to/delay.json |
| 1519928141000 | 0 | RELOAD | https://www.path.to/reload.json |
| 1519928141000 | 0 | START_BROADCASTING | https://www.path.to/start_broadcasting.json |
| 1519928141000 | 0 | MEDIA | https://www.path.to/media.json |
| 1519928141000 | 210000 | CUEPOINT | https://www.path.to/cuepoint_01.json |
| 1519928194000 | 210000 | CUEPOINT | https://www.path.to/cuepoint_01.json |
| 1519928198000 | 210000 | CUEPOINT | https://www.path.to/cuepoint_02.json |
| 1519928199000 | 210000 | CUEPOINT | https://www.path.to/cuepoint_03.json |
| 1519928202000 | 210000 | CUEPOINT | https://www.path.to/cuepoint_04.json |
| 1519928203000 | 210000 | CUEPOINT | https://www.path.to/cuepoint_05.json |
| 1519928228000 | 210000 | END_BROADCASTING | https://www.path.to/end_broadcasting.json |

FIG. 2F

Example Text Format for Command Manifest File

```
1519927808000,0,STAND_BY,https://www.path.to/stand_by.json
1519928141000,0,DELAY,https://www.path.to/delay.json
1519928141000,0,RELOAD,https://www.path.to/reload.json
1519928141000,0,START_BROADCASTING,https://www.path.to/start_broadcasting.json
1519928141000,0,MEDIA,https://www.path.to/media.json
1519928141000,210000,CUEPOINT,https://www.path.to/cuepoint_01.json
1519928194000,210000,CUEPOINT,https://www.path.to/cuepoint_02.json
1519928198000,210000,CUEPOINT,https://www.path.to/cuepoint_03.json
1519928199000,210000,CUEPOINT,https://www.path.to/cuepoint_04.json
1519928202000,210000,CUEPOINT,https://www.path.to/cuepoint_05.json
1519928203000,210000,CUEPOINT,https://www.path.to/cuepoint_06.json
1519928228000,210000,END_BROADCASTING,https://www.path.to/end_broadcasting.json
```

FIG. 2G

METHOD TO RE-SYNCHRONIZE LIVE MEDIA STREAMS, COMMANDS, AND ON-SCREEN EVENTS TRANSMITTED THROUGH DIFFERENT INTERNET PATHWAYS

RELATED APPLICATION

This application claims the benefit of U.S. Provisional Application No. 62/549,620, filed on Aug. 24, 2017. The entire teachings of the above applications are incorporated herein by reference. This application is related to U.S. application Ser. No. 15/922,557, filed Mar. 15, 2018, which is incorporated by reference in its entirety.

BACKGROUND

As network bandwidth has increased over the years, multimedia technology has made it possible to broadcast multimedia programs and content comprising multiple corresponding media streams, such as a webcast, over the Internet to user devices for viewing. Multimedia technology has further enabled transmitting each of the media streams from different sources through different Internet pathways to the user devices. For example, the multimedia content may be an online video presentation, comprised of a live video image of a presenter streamed over an Internet pathway to viewer/player devices. The content may also comprise a corresponding sequence of presentation slides being discussed by the speaker, which is streamed from a separate device over a separate network pathway to the user devices. However, due to differing latencies, encoding and transcoding times, network and local buffering, and other such delays in the different Internet pathways, the receipt of the media stream and the presentation slides through different pathways are typically out of synchronization when they arrive at a viewing device. For example, the playback of the streamed live video over the first network pathway may be received seconds or even minutes behind the sequence of presentation slides received over the other network pathway. Such time discrepancies between receipt of the corresponding media streams may also vary among the different user devices receiving the media streams. Because the streamed media and the on-screen events that are intended to be viewed in synchronization with the streamed media may arrive at the viewer's computer at different times because of these varying and unpredictable delays, combining them into a unified viewing experience without re-synchronization risks an incoherent viewing experience.

SUMMARY

Embodiments of the present invention are directed to computer systems, methods, and program products for re-synchronizing different media streams of multimedia content, commands, and on-screen events that are transmitted over different Internet pathways using multimedia streaming technology.

Some computer system embodiments re-synchronize the playback of a live media stream with the execution of a stream of out-of-band commands. In these computer system embodiments, the system may comprise a media encoder operated by a publisher user. In some embodiments, the media encoder is implemented as one of a software-based media encoder, a hardware-based media encoder, or a cloud-based media encoder. In example embodiments, the media encoder is one of: Telstra Wirecast, Adobe Live Media Encoder, NewTek TriCaster, Zoom Video Webinar, Pexip Infinity, or such. The media encoder is configured to capture input from source devices. In some embodiments, the input is at least one of video and audio, and the source devices are at least one of: camera or microphone. The media encoder is configured to encode the captured input to a standard media format, such as MPEG-4, H.264, and the like. The media encoder is configured to transmit the encoded input as a stream, using a real-time streaming protocol, to a streaming media server. The real-time streaming protocol may be one of: Real-Time Messaging Protocol (RTMP), Real-Time Streaming Protocol (RTSP), Web Real-Time Communications (WebRTC), and such.

In computer system embodiments, the system may further comprise the streaming media server coupled to the media encoder. In some embodiments, the streaming media server is one of: Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental MediaLive, Wowza Streaming Cloud, or such. The streaming media server is configured to receive the input media stream from the media encoder. The streaming media server is configured to transcode the received input media stream to a live streaming format compatible with content delivery (referred to as an output media stream). In some embodiments, the media stream is transcoded by the streaming media server using a Hypertext Transfer Protocol (HTTP) protocol that is one of: HTTP Live Streaming (HLS), MPEG-DASH, or such. The streaming media server is configured to generate and maintain a media stream playlist. In some embodiments, the generated media stream playlist maintains references to older media segments of the transcoded media stream, while gaining references to new media segments, throughout full duration of the input media stream. The streaming media server is configured to at least one of: host the output media stream or transmit the output media stream to a Content Distribution Network (CDN) for delivery.

In computer system embodiments, the system comprises a publishing client logically independent of the media encoder and streaming media server. The publishing client is operated by the publisher user simultaneous to operation of the media encoder by the publisher user. The publishing client is configured to prompt the publisher user to enter location of the output media stream and prompt the publisher user to enter start time at which the media encoder began encoding the input media stream. The publishing client is also configured to enable the publisher user to adjust an offset time and enable the publisher user to initiate commands at particular times. The user-initiated commands are relevant to the input being simultaneously captured by the media encoder. In some embodiments, the user-initiated commands include at least one of a command to display a slide image, a notification message, an advertisement, a statistic, a sporting event score, a caption, a translation, a video overlay, a question, a social media post, a chat or text message, a survey, a live web page, a footnote, a thumbnail, a chapter title, and such. The publishing client is configured to transmit the location of the output media stream, the start time of the input media stream, the adjusted offset time, and the user-initiated commands to a publishing server.

In computer system embodiments, the system further comprises the publishing server coupled to the publishing client. The publishing server is configured to receive the location of the output media stream, the start time of the input media stream, the adjusted offset time, and the user-initiated commands from the publishing client. The publishing server is also configured to generate and maintain a command manifest file. In some embodiments, the command manifest file is in a text format that is one of: CSV, JSON, or XML. The publishing server is configured to write the location of the output media stream and the start time of the input media stream as a command (e.g., first command) in the command manifest file. The publishing server is further configured to append the sequence of the user-initiated commands to the command manifest file as the user-initiated commands are received from the publishing client. Each new command is appended to the end of the command manifest file together with a clock time in which the new command is received by the publishing server and the adjusted offset time. In some embodiments, each new command is appended to the end of the command manifest file as one of: a new line of text or a data object. The publishing server is configured to at least one of: host the command manifest file or transmit the command manifest file to a CDN for delivery.

In computer system embodiments, the system further comprises a multimedia player running on a client device of a viewer user. In some embodiments, the multimedia player runs in one of: a web browser, a mobile application, or such on the client device. The multimedia player is configured to retrieve the command manifest file from at least one of: the publishing server or the CDN. The multimedia player is configured to parse the location of the output media stream from the retrieved command manifest file and load, buffer, and present the output media stream to the viewer user. The multimedia player is further configured to poll for user-initiated commands appended to the command manifest file and start playback of the output media stream.

The multimedia player is then configured to monitor current playback time of the output media stream. In some embodiments, the current playback time is calculated as number of milliseconds between the start time of the input media stream and time of a currently presented frame of the output media stream. The multimedia player is configured to determine whether to execute a command of the command manifest file in a user interface of the multimedia player based on the current playback time. In some embodiments, if the sum of the media start time and the current playback time is (a) greater than or equal to the sum of server time that a particular command was received, plus the offset time of the particular command, and (b) less than the sum of server time that a next command in the sequence of user-initiated commands was received, plus offset time of the next command, the multimedia player is configured to execute the command in the user interface of multimedia player. In example embodiments, executing the command includes one of: displaying a slide image or a notification message to the viewer user displaying a slide image, a notification message, an advertisement, a statistic, a sporting event score, a caption, a translation, a video overlay, a question, a social media post, a chat or text message, a survey, a live web page, a footnote, a thumbnail, a chapter title, and such. Further, if the output media stream is paused or rewound, when the multimedia player restarts the paused or rewound output media stream at a respective playback time, the multimedia player is configured to determine whether to execute a command of the polled user-initiated commands in a user interface of the multimedia player based on the respective playback time.

In other computer system embodiments, the system comprises a media encoder configured to capture a continuous live media stream of online (e.g., web-based) multimedia content transmitted through a first network pathway (e.g., over an out-of-band network). The live media stream may contain at least one of: live or pre-recorded video, audio, or animation. The system further comprises a streaming media server coupled to the media encoder through the first network pathway. The streaming media server is configured to generate and maintain an output media stream playlist such that the playlist maintains all references to older media segments while gaining new references, throughout the full duration of the stream. The streaming media server transcodes the live media stream into segments or packets of a target time length, which are stored at a dedicated memory location. The streaming media server also creates and updates a metadata file or structure (i.e., playlist file), such as in a text, XML, JSON, or CSV file, with information on the sequence of segments or packets of the live media stream. The information stored in the playlist file includes information on each stored segment of the live media stream, such as where stored, hosted, identifier, date, time, size (time length), and the like.

In example other system embodiments, the media encoder is a video client, the streaming media server is a video server, and the live media stream is a video stream. In these embodiments, the media encoder is configured to capture the live video stream as one of: MPEG-4, Windows Media, Quicktime, Audio Video Interleave (AVI), and the like. In these embodiments, the video stream may be at least one of transcoded and transmitted over the network using HTTP Live Streaming (HLS) protocol, MPEG-DASH protocol, or other such streaming protocol.

In the other computer system embodiments, the system further comprises a publishing client which may be communicatively coupled to the media encoder. The publishing client is configured to catalog, store, and transmit media content, such as images, text, and interactive elements, that are intended to be viewed in synchronization with the live media stream. The publishing client is further configured to create a stream of commands, each of which might be associated with an on-screen event that is intended to be displayed on a viewing device at a specific moment as the live media stream is being player on that viewing device. The publishing server generates and maintains a command manifest (metadata) file to record triggered on-screen events of the command stream. In example embodiments, the command file is a manifest file structured in text, XML, JSON, CSV, or the like. The publishing server is configured to record each triggered event in the command manifest file with an associated event time computed based on the start time of the live media stream. In example embodiments, the command stream is a set of slides and the sequence of events is a sequence of changing the slide during the online presentation.

In some of the other system embodiments, the publishing server is configured to generate the command manifest file in communication with the publishing client. As a new event of the sequence of events is triggered (e.g., by a user), the publishing client is configured to capture the new triggered event and transmit a notification of the new triggered event to the publishing server. The publishing server is configured to set the start time of the live media stream and determine the offset between the start time of the sequence of events and the set start time of the live media stream. The publishing server is further configured to determine the clock time for the new triggered event. The publishing server is configured to compute an event time for the new triggered event based on the determined clock time and the determined offset. The publishing server is configured to then record (log) an identifier of the new triggered event and the computed event time in the command file.

In the other computer system embodiments, the system further comprises a multimedia player coupled to the streaming media server and the publishing server through two different internet pathways. Each of these pathways may experience different encoding and transmission delays or latencies, so that the live media stream and the command stream may arrive many seconds or even minutes out of synchronization, due to these different latencies. The multimedia player is configured to present the live media stream retrieved from the streaming media server. The multimedia player is further configured to poll the playlist at the streaming media server to determine a current playback time of the live media stream based on the start time of the live media stream. In some embodiments, the multimedia player is configured to retrieve the current media playback time from the embedded media player. The multimedia player is also configured to poll the command file at the publishing server to determine a new triggered event and associated event time. If the event time of the new triggered event corresponds to the current playback time of the live media stream, the multimedia player is configured to present the new event on the multimedia player synchronized (locked) to the live media stream. In example embodiments, the multimedia player is configured with an embedded browser-based media player.

Some computer-implemented method embodiments re-synchronize the playback of a live media stream with the execution of a stream of out-of-band commands. In these computer-implemented method embodiments, the method performs operations at a media encoder operated by a publisher user. In some embodiments, the media encoder is implemented as one of a software-based media encoder, a hardware-based media encoder, or a cloud-based media encoder. In example embodiments, the media encoder is one of: Telstra Wirecast, Adobe Live Media Encoder, NewTek TriCaster, Zoom Video Webinar, Pexip Infinity, or such. The method, at the media encoder, captures input from source devices. In some embodiments, the input is at least one of video and audio, and the source devices are at least one of: camera or microphone. The method, at the media encoder, encodes the captured input to a standard media format, such as MPEG-4, H.264, and the like. The method, at the media encoder, transmits the encoded input as a stream, using a real-time streaming protocol, to a streaming media server. The real-time streaming protocol may be one of: Real-Time Messaging Protocol (RTMP), Real-Time Streaming Protocol (RTSP), Web Real-Time Communications (WebRTC), and such.

In computer-implemented method embodiments, the method performs operations at the streaming media server coupled to the media encoder. In some embodiments, the streaming media server is one of: Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental MediaLive, Wowza Streaming Cloud, or such. The method, at the streaming media server, receives the input media stream from the media encoder. The method, at the streaming media server, transcodes the received input media stream to a live streaming format compatible with content delivery (referred to as an output media stream). In some embodiments, the media stream is transcoded by the streaming media server using a Hypertext Transfer Protocol (HTTP) protocol that is one of: HTTP Live Streaming (HLS), MPEG-DASH, or such. The method, at the streaming media server, generates and maintains a media stream playlist. In some embodiments, the generated media stream playlist maintains references to older media segments of the transcoded media stream, while gaining references to new media segments, throughout full duration of the input media stream. The method, at the streaming media server, at least one of: hosts the output media stream or transmits the output media stream to a Content Distribution Network (CDN) for delivery.

In computer-implemented method embodiments, the method performs operations at a publishing client logically independent of the media encoder and streaming media server. The publishing client is operated by the publisher user simultaneous to operation of the media encoder by the publisher user. The method, at the publishing client, prompts the publisher user to enter location of the output media stream and prompts the publisher user to enter start time at which the media encoder began encoding the input media stream. The method, at the publishing client, also enables the publisher user to adjust an offset time and enables the publisher user to initiate commands at particular times. The user-initiated commands are relevant to the input being simultaneously captured by the media encoder. In some embodiments, the user-initiated commands include at least one of: a slide image, a notification message, an advertisement, a statistic, a sporting event score, a caption, a translation, a video overlay, a question, a social media post, a chat or text message, a survey, a live web page, a footnote, a thumbnail, a chapter title, or such. The method, at the publishing client, transmits the location of the output media stream, the start time of the input media stream, the adjusted offset time, and the user-initiated commands to a publishing server.

In computer-implemented method embodiments, the method performs operations at the publishing server coupled to the publishing client. The method, at the publishing server, receives the location of the output media stream, the start time of the input media stream, the adjusted offset time, and the user-initiated commands from the publishing client. The method, at the publishing server, also generates and maintains a command manifest file. In some embodiments, the command manifest file is in a text format that is one of: CSV, JSON, or XML. The publishing server is configured to write the location of the output media stream and the start time of the input media stream as a first command in the command manifest file. The method, at the publishing server, appends the sequence of the user-initiated commands to the command manifest file as the user-initiated commands are received from the publishing client. Each new command is appended to the end of the command manifest file together with a clock time in which the new command is received by the publishing server and the adjusted offset time. In some embodiments, each new command is appended to the end of the command manifest file as one of: a new line of text or a data object. The method, at the publishing server, at least one of: hosts the command manifest file or transmits the command manifest file to a CDN for delivery.

In computer-implemented method embodiments, the method performs operations at a multimedia player running on a client device of a viewer user. In some embodiments, the multimedia player runs in one of: a web browser, a mobile application, or such on the client device. The method, at the multimedia player, retrieves the command manifest file from at least one of: the publishing server or the CDN. The method, at the multimedia player, retrieves the command manifest file from at least one of: the publishing server or the CDN. The method, at the multimedia player, parses the location of the output media stream from the retrieved command manifest file and loads, buffers, and presents the output media stream to the viewer user. The method, at the multimedia player, polls for user-initiated commands appended to the command manifest file and starts playback of the output media stream.

The method, at the multimedia player, then monitors current playback time of the output media stream. In some embodiments, the current playback time is calculated as number of milliseconds between the start time of the input media stream and time of a currently presented frame of the output media stream. The method, at the multimedia player, determines whether to execute a command of the command manifest file in a user interface of the multimedia player based on the current playback time. In some embodiments, if the sum of the media start time and the current playback time is (a) greater than or equal to the sum of server time that a particular command was received, plus the offset time of the particular command, and (b) less than the sum of server time that a next command in the sequence of user-initiated commands was received, plus offset time of the next command, execute the command in the user interface of multimedia player, the method executes the command in the user interface of the multimedia player. In example embodiments, executing the command includes one of: displaying a slide image or a notification message to the viewer user displaying a slide image, a notification message, an advertisement, a statistic, a sporting event score, a caption, a translation, a video overlay, a question, a social media post, a chat or text message, a survey, a live web page, a footnote, a thumbnail, and a chapter title, or such. Further, if the output media stream is paused or rewound, when restarting the paused or rewound output media stream at a respective playback time, determining whether to execute a command of the polled user-initiated commands in a user interface of the multimedia player based on the respective playback time.

In other computer-implemented method embodiments, the method initiates a live media stream of an online presentation transmitted through a first network pathway over an out-of-band network. The method also stores the start time corresponding to the initiation of the live media stream. As the live media stream is being continuously streamed over the network (via the first network pathway), the method presents the live media stream on a multimedia player. The method also polls a metadata file (i.e., playlist file) configured on a streaming media server to determine a current playback time of the live media stream based on the stored start time. In example embodiments, the playlist is a manifest file structured in XML, JSON, CSV, text, or the like.

In example other method embodiments the live media stream is a live video stream. In these other embodiments, the method captures the video stream as one of: MPEG-4, Windows Media, Quicktime, Audio Video Interleave (AVI), and the like. In these other embodiments, the video stream may be at least one of transcoded and transmitted over the network using HTTP Live Streaming (HLS) protocol, MPEG-DASH protocol, or another streaming protocol. In example embodiments, the multimedia player is configured with a browser-based video player and the metadata file (e.g., playlist file) is structured as a manifest that lists Internet locations where each segment of the live media stream is located for retrieval and playback. This manifest is read by the browser-based video player, which plays back the live media stream segments in the proper order, and determines the current media playback time of the live media stream.

In these other computer-implemented method embodiments, the method also polls a command file to determine a new triggered event of a sequence of events logged to the file. In example embodiments, the command file is a manifest file in text, XML, JSON, CSV, or the like. The sequence of events is associated with a command stream of the online presentation transmitted over a second network pathway. In example other method embodiments, the command stream is a set of slides and the sequence of events is a sequence of changing the slide during the online presentation. The new triggered event has an associated event time computed based on the stored start time of the live media stream. If the event time of the new triggered event corresponds to the current playback time of the live media stream, the method presents the new triggered event on the multimedia player synchronized (locked) to the live media stream.

In these other method embodiments, the method generates and logs to the command file as follows. As a new event of the sequence of events triggers (e.g., by a user), the method captures the new triggered event. The method determines clock time for the new triggered event. The method also determines the offset between the stored start time of the live media stream and start time of the sequence of events. The method computes an event time for the new triggered event based on the determined clock time and the determined offset. The method records (logs) an identifier of the new triggered event and the computed event time in the command file synchronized (locked) to the live media stream.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2F and 2G are example command manifest data files generated in example embodiments of the present invention.

DETAILED DESCRIPTION

A description of example embodiments follows.

The teachings of all patents, published applications and references cited herein are incorporated by reference in their entirety.

Digital Processing Environment

Figure 1A:
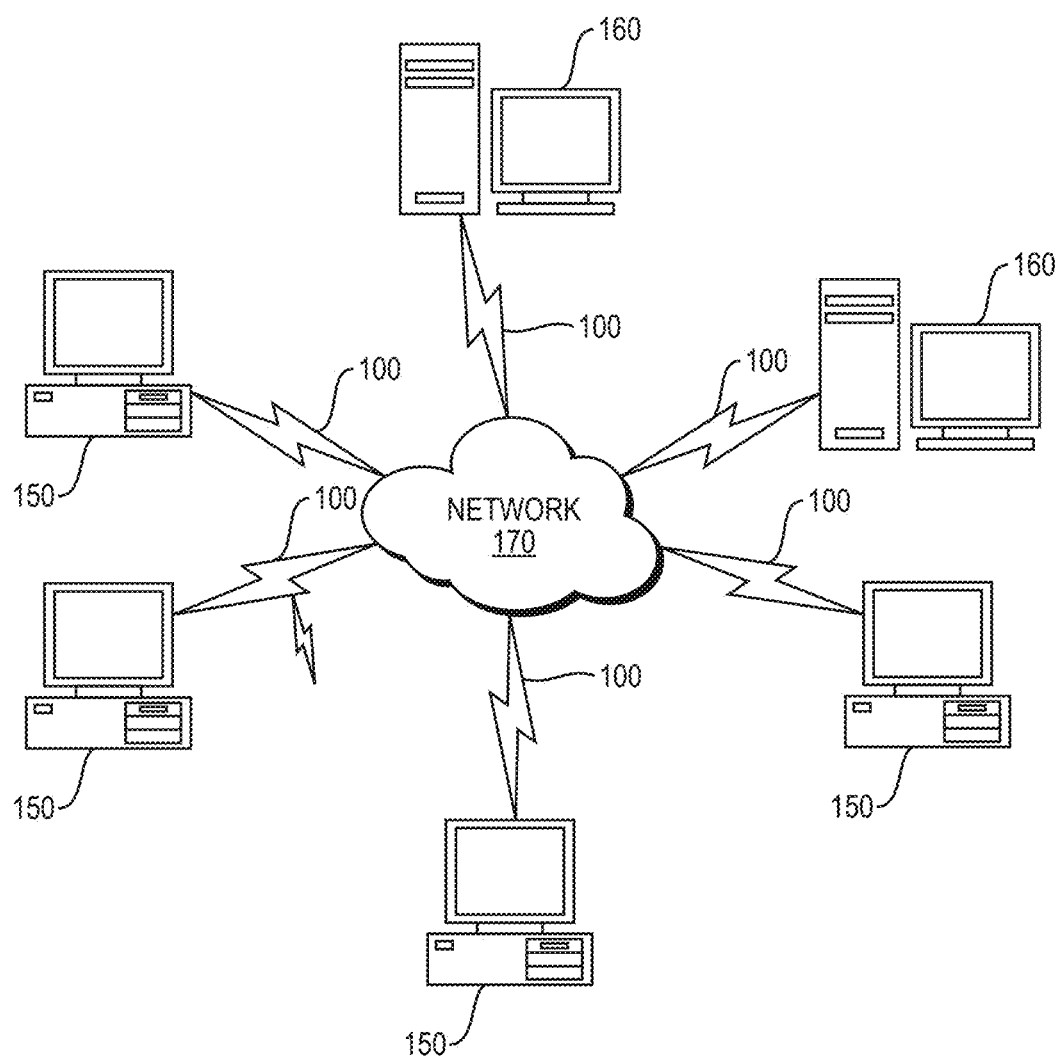
FIG. 1A is a schematic diagram of an example computer network environment in which embodiments of the present invention are deployed.

Example implementations of a multimedia system 100 for re-synchronizing a current playback time of a live media stream with execution of a stream of out-of-band commands and on-screen events in an online (e.g., web-based) presentation may be implemented in a software, firmware, or hardware environment. FIG. 1A illustrates one such environment. Client computer(s)/devices 150 (e.g. a mobile phone) and a cloud 160 (or server computer or cluster thereof) provide processing, storage, and input/output devices executing application programs and the like.

Client computer(s)/devices 150 are be linked through communications network 170 to other computing devices, including other client devices/processes 150 and server computer(s) 160. Communications network 170 can be part of a remote access network, a global network (e.g., the Internet), an out-of-band network, a worldwide collection of computers, Local area or Wide area networks, cloud networks, and gateways that currently use respective protocols (TCP/IP, HTTP, Bluetooth, etc.) to communicate with one another. Other electronic device/computer network architectures are suitable.

Figure 2A:
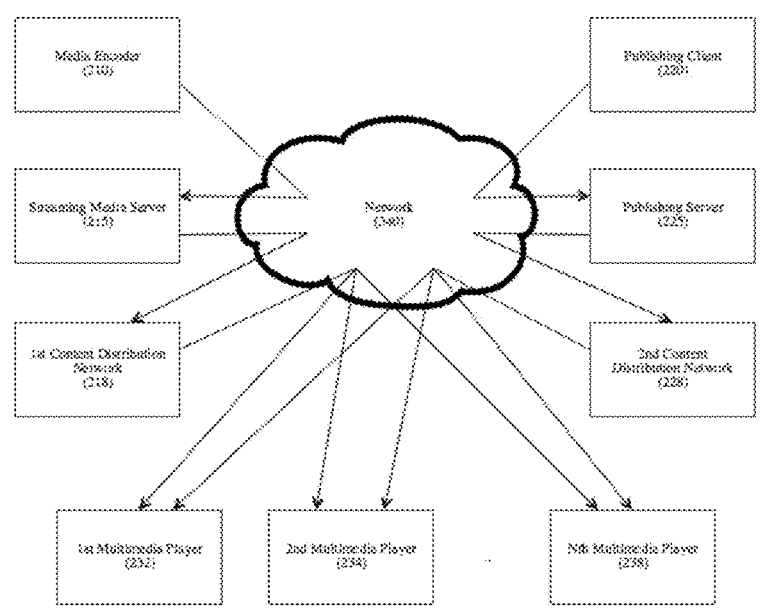
FIG. 2A is a block diagram of a system for re-synchronizing playback of a live media stream with a stream of commands and on-screen events according to embodiments of the present invention.

Sever computers 160 may be configured to implement a streaming media server (e.g., 215 of FIG. 2A) for provisioning, formatting, and storing the live media stream (such as audio, video, text, and images/pictures) of a presentation, which are processed and played at client computer(s)/devices 150 (such as multimedia players 232-238 in FIG. 2A). The server computers 160 are communicatively coupled to client computer(s)/devices 150 that implement respective media encoders (e.g., 210 of FIG. 2A) for capturing, encoding loading, or otherwise providing the live media stream that are transmitted to the server computers 160. In one example embodiment, one or more of the server computers 160 are Java application servers that are scalable such that if there are spikes in traffic, the servers can handle the load increase.

A first server computer 160 (e.g., streaming media server 215 of FIG. 2A) may receive and partition a live media stream captured/recorded at an associate first client computer/device 150 (e.g., media encoder 210 of FIG. 2A) into segments. The first server computer 160 may store information related to the segments in a metadata structure. A second client computer/device 150 (e.g., publishing client 220 of FIG. 2A) may detect a user-initiated command of a stream of user-initiated commands detected by the second client computer/device 150. The second client computer/device 150 may register the user-initiated command (e.g., sequencing or selecting a new slide, displaying a slide image, a notification message, an advertisement, a statistic, a sporting event score, a caption, a translation, a video overlay, a question, a social media post, a chat or text message, a survey, a live web page, a footnote, a thumbnail, a chapter title, and such) and notify the second server computer 160 (e.g., publishing server 225 of FIG. 2A) of the user-initiated command and an associated start time of the live media stream, offset time, and location of the live media stream. The second server computer 160 may record (e.g., in a manifest file as shown in FIGS. 2F and 2G) one or more of: an identifier of the user-initiated command, a command type, a command parameter, server clock time, start time of the media stream, and parameters of the user-initiated command, and such.

Other client computers/devices 150 (such as multimedia players 232-238 in FIG. 2A) may retrieve information from the command manifest file and use the information to re-synchronizing playback of a live media stream with execution of the user-initiated command for display in the presentation. For example, a user (viewer) may select to view the live media stream event from any point in the live media stream, and commands are executed in the intended synchronization with the viewed live media stream to properly display visual elements associated with the live media stream. The user may further interact with displayed visual elements (e.g., chapter title) to cause the live media stream to re-cue to the corresponding point in the live media stream, and re-synchronize all other displayed visual elements to the re-cued media stream (e.g., statistics or scores).

Figure 1B:
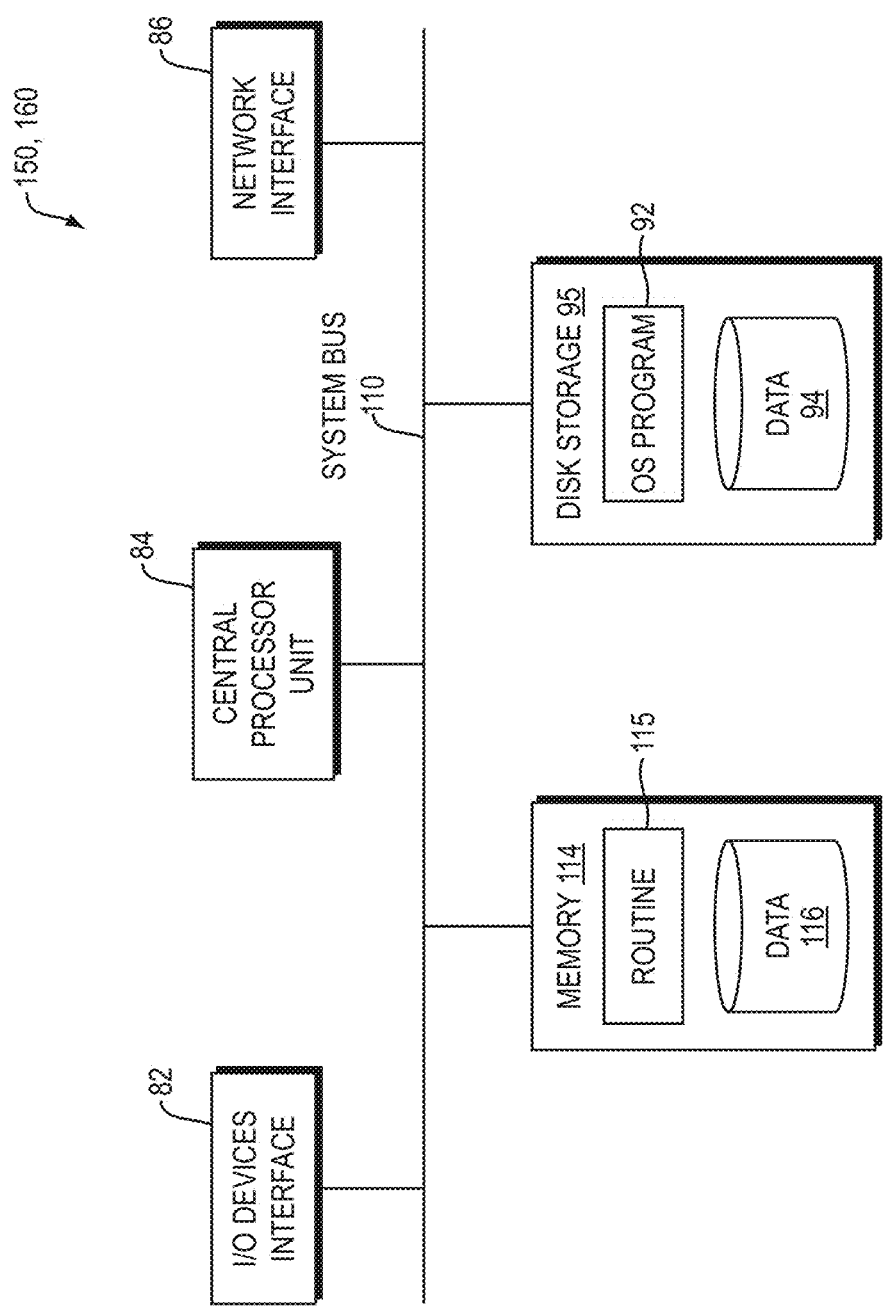
FIG. 1B is a block diagram of the computer nodes in the network of FIG. 1A.

FIG. 1B is a diagram of the internal structure of a computer/computing node (e.g., client processor/device/mobile phone device/tablet 150 or server computers 160) in the processing environment of FIG. 1A, which may be used to facilitate displaying such audio, video, image, or data signal information. Each computer 150, 160 contains a system bus 110, where a bus is a set of actual or virtual hardware lines used for data transfer among the components of a computer or processing system. Bus 110 is essentially a shared conduit that connects different elements of a computer system (e.g., processor, disk storage, memory, input/output ports, etc.) that enables the transfer of data between the elements. Attached to system bus 110 is I/O device interface 82 for connecting various input and output devices (e.g., keyboard, mouse, touch screen interface, displays, printers, speakers, etc.) to the computer 150, 160. Network interface 86 allows the computer to connect to various other devices attached to a network (for example the network illustrated at 170 of FIG. 1A). Memory 114 provides volatile storage for computer software instructions 115 and data 116 used to implement a software implementation of the present invention (e.g. capturing/loading, provisioning, formatting, retrieving, downloading, and/or storing live media streams and stream of user-initiated commands).

Disk storage 95 provides non-volatile storage for computer software instructions 92 (equivalently "OS program") and data 94 used to implement embodiments of the multimedia system 100 of the present invention. Central processor unit 84 is also attached to system bus 110 and provides for the execution of computer instructions.

In one embodiment, the processor routines 92 and data 94 are a computer program product, including a computer readable medium capable of being stored on a storage device 95, which provides at least a portion of the software instructions for the multimedia system 100. Instances of the timing selector 1102, timing selector 1132, event time adjuster 1152, synchronizer 1103, event capturer 1133, event recorder 1153, publisher 1136, player 1106, search engine 1107 (of FIGS. 3A-3C), and other software embodiments of the multimedia system 100 may be implemented as a computer program product 92, and can be installed by any suitable software installation procedure, as is well known in the art. In another embodiment, at least a portion of the multimedia system 100 instructions may also be downloaded over a cable, communication and/or wireless connection. In other embodiments, the multimedia system 100 software components may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the multimedia system 100 routines/program 92.

In alternate embodiments, the propagated signal is an analog carrier wave or digital signal carried on the propagated medium. For example, the propagated signal may be a digitized signal propagated over a global network (e.g., the Internet), a telecommunications network, an out-of-band network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 150 may receive and read, such as by receiving the propagation medium and identifying a propagated signal embodied in the propagation medium, as described above for computer program propagated signal product.

The multimedia system 100 described herein may be configured using any known programming language, including any high-level, object-oriented programming language. A client computer/device 150 (e.g., multimedia player 232, 234, 238 of FIG. 2A) of the multimedia system 100 may be implemented via a software embodiment and may operate within a browser session. The multimedia system 100 may be developed using HTML, JavaScript, Flash, and such. The HTML code may be configured to embed the system into a web browsing session at a client 150. The Java Script can be configured to perform clickstream and session tracking at the client 150 (e.g., publishing client 220 of FIG. 2A) and store the streaming media recordings and editing data in a cache. In another embodiment, the system may be implemented in HTML5 for client devices 150 that do not have Flash installed and use HTTP Live Streaming (HLS) or MPEG-DASH protocol. The system may be implemented to transmit media streams using a real-time streaming protocol, such as: Real-Time Messaging Protocol (RTMP), Real-Time Streaming Protocol (RTSP), Web Real-Time Communications (WebRTC), and the like. Components of the multimedia system 100 may be configured to create and load an XML, JSON, or CSV data file or other structured metadata file (such as a manifest file) with information about where and how components of the multimedia system 100 are stored, hosted, or formatted, such as timing information, size, footnote, attachments, interactive components, style sheets, etc.

In an example mobile implementation, the user interface framework for the components of the multimedia system 100 may be based on XHP, Javelin and WURFL. In another example mobile implementation for OS X and iOS operating systems and their respective APIs, Cocoa and Cocoa Touch may be used to implement the player 102 using Objective-C or any other high-level programming language that adds Smalltalk-style messaging to the C programming language.

System for Re-Synchronizing

FIG. 2A is a block diagram of a system 200 for re-synchronizing the playback of a live media stream with the execution of a stream of out-of-band commands and on-screen events in an example embodiment of the present invention. These commands typically trigger on-screen events, such as changes in displayed images, text, and interactive elements. The system 200 is an example implementation of the computer network environment 100 of FIG. 1A. In FIG. 2A, the system 200 re-synchronizes the playback of a live media stream with the execution of a stream of commands transmitted through different Internet pathways. The encoding, transmission, transcoding, distribution, download, and buffering of the live media stream may result in a latency between the time of capture and the time of playback in the multimedia players 232, 234, 238 that is different from the latency between the time a command was initiated by a publisher and the time is received by the multimedia players. For example, a particular frame of media may be captured at the media encoder 210 simultaneous to the time that a corresponding command was initiated by a publisher at the publishing client 220, but the multimedia players 232, 234, 238 may receive the command in the command stream before the corresponding frame of media is displayed during playback. The difference between the latencies may vary among different multimedia player clients 232, 234, 238. In other embodiments, the system 200 may re-synchronize any number of media streams and command streams through any number of different Internet pathways without limitation. The user may also select a particular point (time) in the live media stream or interaction with one or more visual elements (or on-screen events) displayed by from the execution one or more commands of the stream of commands, resulting in the system 200 re-synchronizing the playback of the live media stream with the stream of commands.

The system 200 includes a media encoder 210 that captures, loads, or otherwise provides the live media stream (containing media content) to a streaming media server 215. In some embodiments, the media encoder 210 may be: Telstra Wirecast, Adobe Live Media Encoder, NewTek TriCaster, Zoom Video Webinar, Pexip Infinity, and the like. In some embodiments, the streaming media server 215 may be Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental MediaLive, Wowza Streaming Cloud, or such. The media content of the live media stream may be audio and/or video, and the like. In example embodiments, the live media stream may contain video content, which is being captured live (in real-time) from a camera/recorder (e.g., webcam) configured on the media encoder 210, a camera/recorder communicatively coupled to the media encoder 210, or any other such live capture of video. In other embodiments, the video content of the live media steam may be pre-recorded videos stored on the media encoder 210 or at a storage device communicatively coupled to the media encoder 210, a live video feed from a web link accessible from the media encoder 210, and such.

In example embodiments, the captured video content of the video stream may be formatted as MPEG-4, Windows Media, Quicktime, Audio Video Interleave (AVI), Flash, or any other video format without limitation. In some example embodiments, the video stream may also be transcoded (video encoded) or otherwise digitally converted for transfer and use at the streaming media server 215 and multimedia players 232, 234, 238. The video stream (or other media stream) may be transferred to the streaming media server 215 and multimedia players 232, 234, 238 using Real-Time Messaging Protocol (RTMP) or HTTP Live Streaming (HLS) or other such streaming protocol.

The streaming media server 215 receives the (continuous) live media stream from the media encoder 210 over network 340. The streaming media server 215 is configured to generate and maintain an output media stream playlist such that the playlist maintains all references to older media segments while gaining new references, throughout the full duration of the stream (e.g., 2 hours). The streaming media server 215 provides a dedicated memory location (e.g., directory or folder) for storing the live media stream. The streaming media server 215 provisions the received live media stream for playback on multimedia players 232, 234, 236. The streaming media server 215 transcodes the live media stream into segments or packets of a target time length, which are stored at the dedicated memory location. The streaming media server 215 also creates and updates a metadata file or structure (e.g. playlist file), such as in a text, XML, or CSV file, with information on the sequence of segments or packets of the live media stream. The information stored in the playlist file includes information on each stored segment of the live media stream, such as where stored, hosted, identifier, date, time, size (time length), and the like. The stored segments and playlist file may be structured according to the player configuration of the multimedia players 232, 234, 236, such as in HTML5-capable browser client.

Based on the playlist file, the multimedia players (i.e., first multimedia player 232, second multimedia player 234, through nth multimedia player 238) retrieve the live (continuous) media stream from the streaming media server 215, and may cache the live media stream at the multimedia players. In embodiments, the live media stream may be retrieved through a first content distribution network (CDN) 218. The multimedia players 232, 234, 238 display the live media stream via respective media players (e.g., HTML5 Video Player or the like) configured on the multimedia players 232, 234, 238 via a web browser. The live media stream may be displayed in a first window or panel of a multimedia player 232, 234, 238.

Figure 2B:
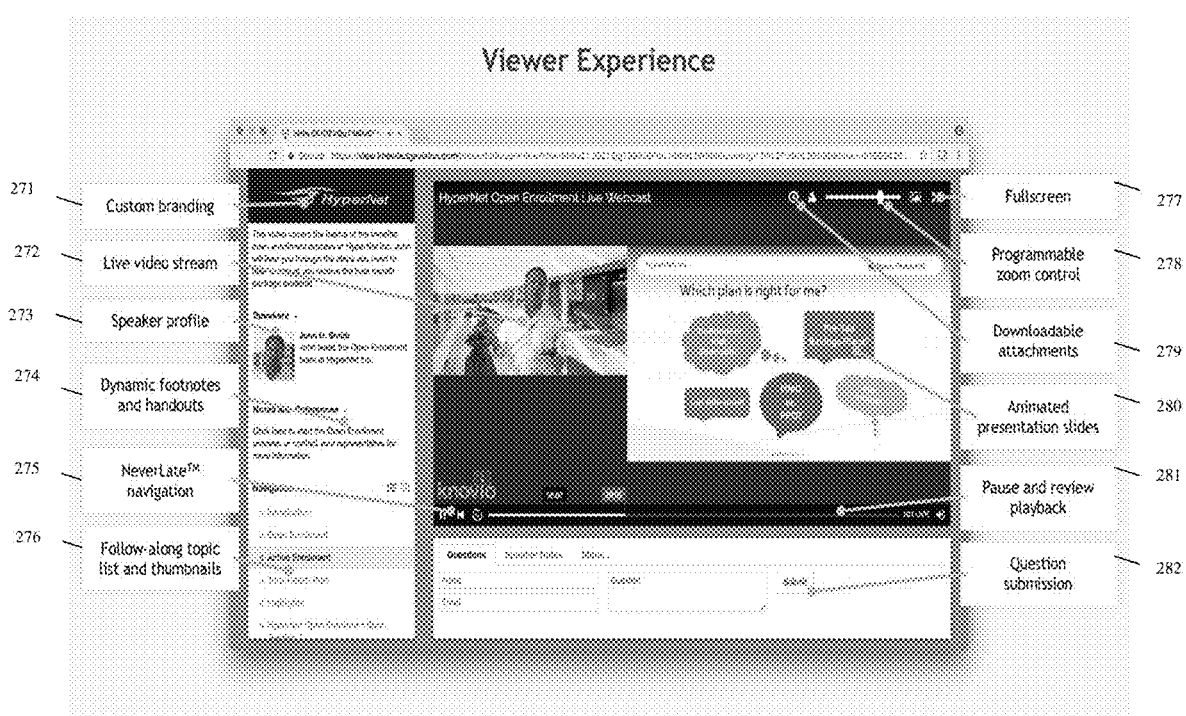
FIG. 2B is a screenshot of an example multimedia player with simultaneous playback of a live media stream with the display of slide images in an example embodiment of the present invention.

FIG. 2B illustrates an example multimedia player 232, 234, 238 displaying a live media stream 272 in a first window or panel as part of a presentation (e.g., webcast). A user may select to adjust playback of the live media stream 272 at any point (time) using a navigation timeline 275, or pause and review playback 281 using the navigation timeline 275. In FIG. 2B, the example multimedia player 232, 234, 238 also displays a second window with visual elements (or on-screen events) displayed by the execution of one or more commands synchronized to the live media stream 272. These visual elements include custom branding 271 for the presentation, a speaker profile 273 for the speaker of the presentation, dynamic footnotes and handouts 274 for the presentation, and follow-along topic list and thumbnails 276 for the presentation. The example multimedia player of FIG. 2B also displays a third window with another visual element of animated presentation slides 280 displayed by the execution of one or more commands synchronized to the live media stream 272, and a fourth window with visual elements for submitting a question 282 by the user related to the current playback point (time) of the live media stream 272. Selecting of one of the visual elements (e.g., one of the dynamic footnotes 274) may re-cue the live media stream 272, and re-synchronize all other displayed visual elements (e.g., topic list and thumbnails 276, animated presentation slides 280, and such) to the playback time of the re-cued live media stream 272. The example multimedia player of FIG. 2B also includes option to present the presentation in a fullscreen 277, control zoom 278, and download attachments 279.

The multimedia player 232, 234, 238 may determine the playback time of the live media stream. In some embodiments, the playback time may be the number of milliseconds between the starting point of the media and the currently presented frame. To do so, the multimedia player 232, 234, 238 polls the API of the HTML5 Video Player via the web browser. In some embodiments, the current playback time may be stored in memory (cache) at the multimedia player 232, 234, 238.

The system 200 also includes the publishing client 220 that provides a stream of user-initiated commands to a publishing server 225. When received and executed by the multimedia players 232, 234, 238, the commands trigger on-screen events in the multimedia player user interface such as displaying graphic images (e.g., pictures, slides, and such), text, video, audio and the like, simultaneous to the playback of the live media stream. In example embodiments, the command stream may contain a sequence of commands to display text and images, such as a set of slides (e.g., PowerPoint slides). A user may load the set of slides via the publishing client 220 and initiate commands on the loaded set of slides (such as sequencing to the next slide or selecting a particular slide, or displaying a slide image, a notification message, an advertisement, a statistic, a sporting event score, a caption, a translation, a video overlay, a question, a social media post, a chat or text message, a survey, a live web page, a footnote, a thumbnail, a chapter title, and such). The publishing server 225 receives the stream of user-initiated commands from the publishing client 220 over network 340. The publishing client 220 may be logically independent of the media encoder 210 and streaming media server 215. The publishing server 225 provisions the received stream of commands for presentation on multimedia players 232, 234, 236. For example, the publishing server 225 generates a metadata file or structure (e.g. command manifest file), such as in a text, XML, or CSV file, for the commands received from the publishing client 220.

Figure 2C:
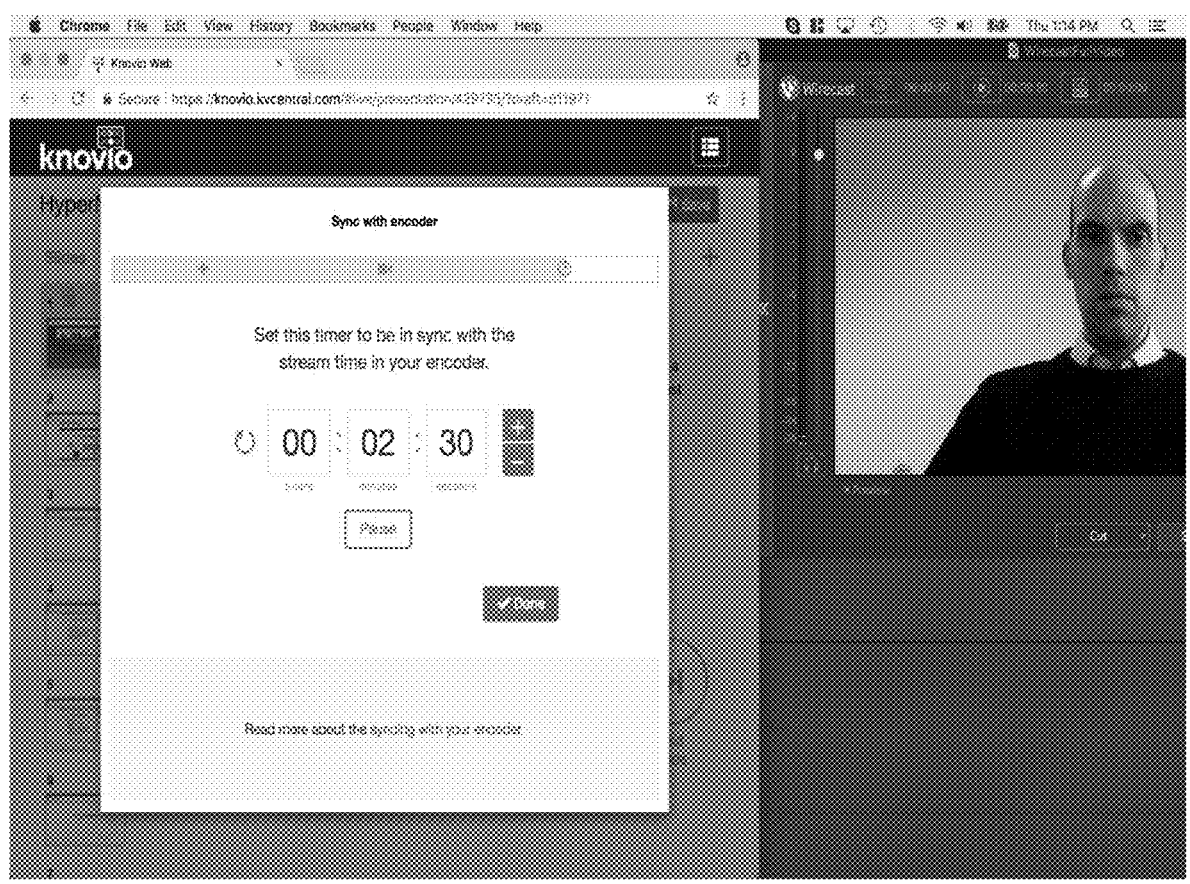
FIG. 2C is a screenshot of an example user interface for entering offset time at a publishing client in an example embodiment of the present invention.
Figure 2D:
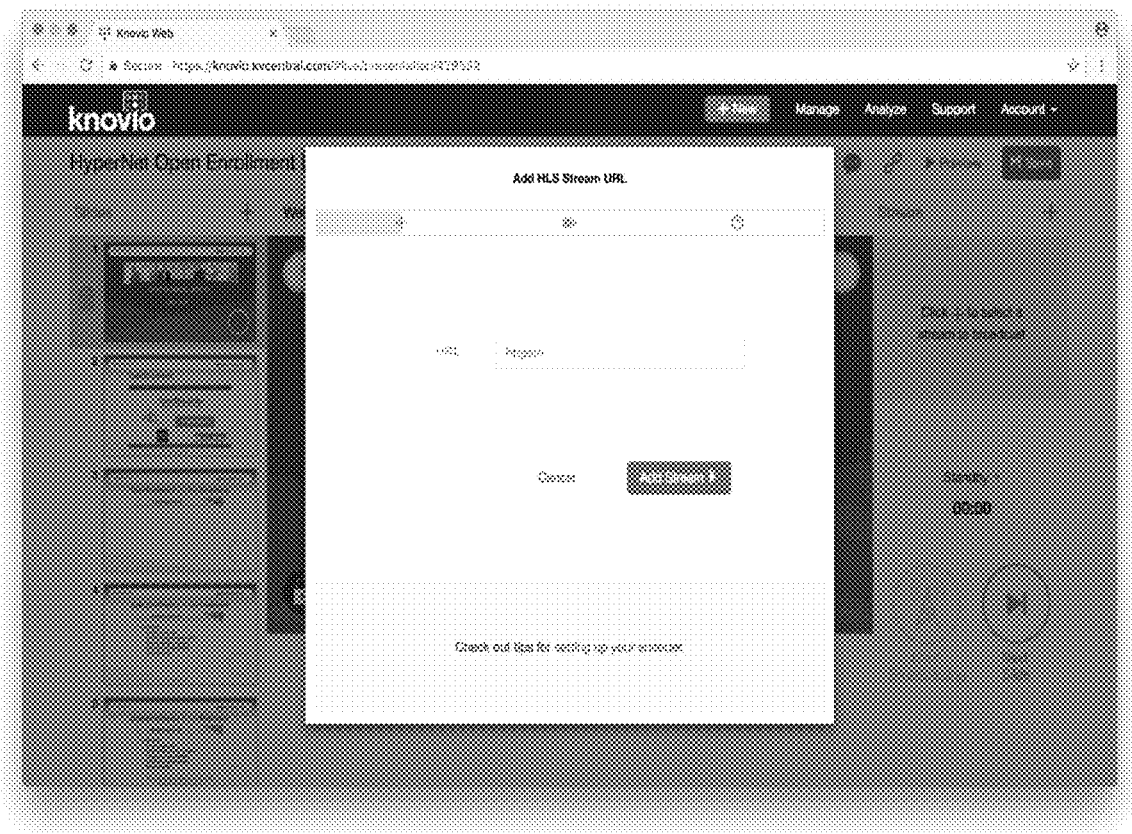
FIG. 2D is a screenshot of an example user interface for entering the location of a live media stream at a publishing client in an example embodiment of the present invention.

In embodiments of the present invention, the publishing client 220 is configured to the time which the media encoder 210 began encoding the live media stream. For example, a user may enter at a user interface of the publishing client 220 the start time at which the media encoder began encoding the live media stream. In embodiments, the publishing client 220 may also or instead be configured with an offset time that can be adjusted after the start time has already been configured. For example, a user may enter at a user interface of the publishing client 220 an offset time in the case that the start time was initially entered inaccurately, in which the offset time is the difference between the inaccurate start time and the accurate start time. FIG. 2C illustrates an example user interface for entering the offset time at the publishing client 220 to synchronize the publishing client 220 to the media encoder 210. In embodiments, the publishing client 220 may also or instead be configured with the location of the live media stream at the streaming media server 215. FIG. 2D illustrates an example user interface for entering the location of a live media stream at the streaming media server 215 or elsewhere. The publishing client 220 communicates the start time of the live media stream, the offset time, and location of the live media stream to the publishing server 225, where the start time, offset time, and location may be stored in memory (cache) or to persistent storage (e.g., database). The publishing server 225 may include the start time, offset time, and/or location of the live media stream as a command (e.g., first command) appended to the command manifest file.

Figure 2E:
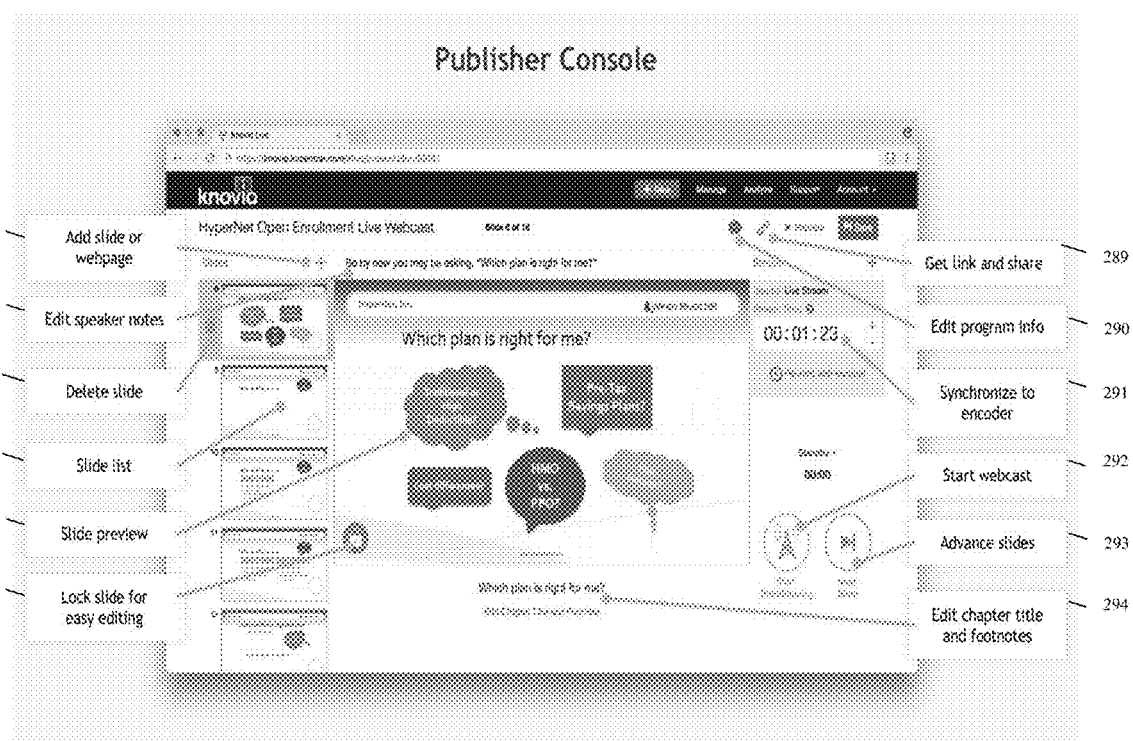
FIG. 2E is a screenshot of an example user interface for where commands are issued to change the selected slides at a publishing client in an example embodiment of the present invention.

Further, when the publishing client 220 registers a user-initiated command (e.g., sequencing or selecting a new slide, or displaying a slide image, a notification message, an advertisement, a statistic, a sporting event score, a caption, a translation, a video overlay, a question, a social media post, a chat or text message, a survey, a live web page, a footnote, a thumbnail, and a chapter title, and such), the publishing client 220 notifies the publishing server 225 of the command. FIG. 2E is a screenshot of an example user interface of the publishing client that generates user-initiated commands from the user creating, updating, loading, and advancing slides (or other on-screen events) for a webcast. The publish client user interface of FIG. 2E includes a first window containing a slide list 286 and features to add a slide or webpage 283, edit speaker notes related to a slide/webpage 284, delete a slide 285, advance a slide 293, and editing a chapter title and footnotes 294 to display for grouping slides. The publishing client user interface also has a second window for displaying a slide preview 287, with an option to lock a previewed slide for easy editing 288. The publishing client user interface also includes an option to synchronize 291 the publishing client 220 to the media encoder 210 (also shown in FIG. 2C), start a webcast 292 including the live media stream, get a link of the webcast to share 289, and edit program 290 information for the webcast. A user advancing a slide 293 (or otherwise controlling the list of slides 286) in the interface of FIG. 2E causes the publishing client 220 to generate (register) a user-initiated command and notifies the publishing client 220 of the command.

The publishing client 220 may transmit in a command notification to the publishing server 225 an identifier of the user-initiated command (e.g., an identifier of the new sequence or selected slide of a slide presentation), or the actual command (e.g., command type and execution parameter). The publishing client 220 may also include in the notification the client clock time that the command was initiated or the publishing server 225 may determine the server clock time (server timestamp) based on the time the server received the notification. In some embodiments, the client clock time or server clock time may be used as the command time for executing the command. In some embodiments, the publishing server 225 may determine the command time for the command based on adjusting the server clock time relative to the start time of the live media stream (based on the configured start time or offset configured at the publishing client 220). The publishing server 225 records the transmitted command together with the calculated command time for the command in the command manifest file. The publishing server may also record one or more of: the current offset time to the live media stream, command identifier, command type, and command parameter for executing the command in the command manifest file.

FIGS. 2F and 2G illustrate example command manifest files used in example embodiments of the present invention. The command manifest file in FIG. 2G is the text format of the command manifest file in FIG. 2F. As shown in FIG. 2F, the command manifest file includes a list of commands to execute in synchronization with a corresponding live media stream. Each command includes a server timestamp indicating the time the command was received at the publishing server 225 (from initiation by a user at the publishing client 220) and an offset time from the start time of the live media stream at the media encoder 210. Each command also includes the command type (e.g., STAND_BY, CUEPOINT, and such) and the parameter to execute the command. Based on polling the example command manifest files of FIG. 2F, the multimedia players 232, 234, 238 start broadcasting the live media stream by executing command "https://www.path.to/start_broadcasting.json" at server time 1519928141000, and begin cueing the first slide in synchronization with the live media stream at server time 1519928141000 (offset by 210000 ms from the start time of the media encoder 210) by executing command "https://www.path.to/cuepoint_01.json". This command is a reference to a secondary JSON cuepoint command file that in turn contains the full details of the command (rather than storing the details directly in the command manifest file).

The following is a JSON format for a cuepoint command file in an example embodiment of the present invention.

```
{
    "time": 0,
    "type": "IMAGE",
    "source": {
        "url": "https://www.path.to/img/slide_01.png",
        "properties": [
            {
                "name": "step",
                "value": "0"
            },
            {
                "name": "live-cue-index",
                "value": "0"
            }
        ]
    },
    "settings": {
        "pause": false,
        "zoom": 0,
        "key": true
    },
    "metadata": {
        "title": "Introduction",
        "footnote": "For more information, visit
                HyperNet.com",
        "smallThumbnail":
                "https://www.path.to/small/slide_01.jpg",
        "largeThumbnail":
                "https://www.path.to/large/slide_01.jpg",
        "speakerNotes": "Welcome to HyperNet's Human
                Resources Open Enrollment presentation!"
    }
}
```

The multimedia players 232, 234, 238 may retrieve command stream from the publishing server 225, and caches the command stream. In embodiments, the command stream may be distributed through a second content distribution network (CDN) 228. The multimedia players 232, 234, 238 poll the command manifest file on the publishing server 225 or CDN 228 to retrieve the command type, command parameter, associated command time (e.g., server time), and offset time. In some embodiments, the multimedia players 232, 234, 238 also retrieve a command identifier, or retrieve the command identifier in place of the command type and command parameter. If the sum of the media start time and the current media playback time is greater than or equal to the sum of the command time and the offset time of the command, and less than the sum of the command time and offset time of the next command in the stream, the multimedia player 232, 234, 238 executes the command, triggering an on-screen event or visual element in the user interface (e.g., advance to a new animated presentation slide 280 in FIG. 2B), simultaneous to and in synchronization with the playback of the live media stream (e.g., live video stream 272 of FIG. 2B). The triggered on-screen event 280 display simultaneous to and in synchronization with the playback of the live media stream 272. Otherwise, the multimedia player 232, 234, 238 waits to execute the command in the user interface of the multimedia player 232, 234, 238 until the calculation of a future playback time.

Further, the multimedia players 232, 234, 238 may synchronize commands and on-screen events to a live media stream even if the live media stream is paused, "rewound", "forwarded," or otherwise adjusted in time, such as watching a digital video recorder (DVR). That is, a user may adjust the live media stream to a new time (a different time than the current playback time of the live media stream) or stop and later re-started the live media stream (e.g., using navigation timeline 275 of FIG. 2B). For example, the live media stream may have an available timeline ranging from (a) time of a first frame of the live media stream to (b) time of a current last frame of the live media stream stored at the streaming media server 215 in a media segment referenced by the media stream playlist. The user may select a new time anywhere on the available timeline to rewind, forward, or otherwise adjust and restart playback of the live media stream (e.g., select a new time on the navigation time 275 of FIG. 2B). For another example, the user may interact with a visual element (on-screen event) displayed on the multimedia player 232, 234, 238, which causes the multimedia players 232, 234, 238 to re-cue/adjust the live media stream to a new selected time that is associated with the visual element. The multimedia players 232, 234, 238 may store in memory (e.g., in a cookie) the current playback time prior to adjustment to the new selected time, and later choose an option to re-adjust playback time back to the stored current playback time.

The multimedia players 232, 234, 238 synchronize the on-screen events (visual elements) displayed on the interfaces of the multimedia players 232, 234, 238 to the adjusted new playback time of the live media stream. For example, if the live media stream is paused/restarted after a delay or rewound to a point/moment in time earlier in the live media stream, the multimedia player 232, 234, 238 synchronize the on-screen events (visual elements) to the earlier point/moment of the live media stream. A user may also select an on-screen event (e.g., thumbnail 276 of FIG. 2B) associated with an earlier point in the live media stream, and embodiments re-cue the current playback of the live media stream to the time of the selected visual element and synchronize the other on-screen events (e.g., displayed slides 280 and footnotes 274 of FIG. 2B) to the adjusted playback time of the live media stream.

To synchronize to the adjusted (e.g., "rewound" or paused/restarted) new time of the live media stream, the multimedia player 232, 234, 238 updates the current playback time of the live media stream to the adjusted time, and restarts the live media stream at the current playback time as adjusted. In some embodiments, multimedia player 232, 234, 238 restarts the live media stream at a frame of a stored media segment at the streaming media server 215 corresponding to the new time, and presents the live media stream at the multimedia player 232, 234, 238 beginning with the restarted frame corresponding to the new selected time. The multimedia player 232, 234, 238 then monitors the current playback time of the output media stream as adjusted. As part of the monitoring, the multimedia player 232, 234, 238 polls the command manifest file based on the current playback time as adjusted to determine corresponding one or more commands and executes the one or more commands to display on-screen events (visual elements) synchronized to the current playback time of the live media stream as adjusted.

System Components for Re-Synchronizing

Figure 3A:
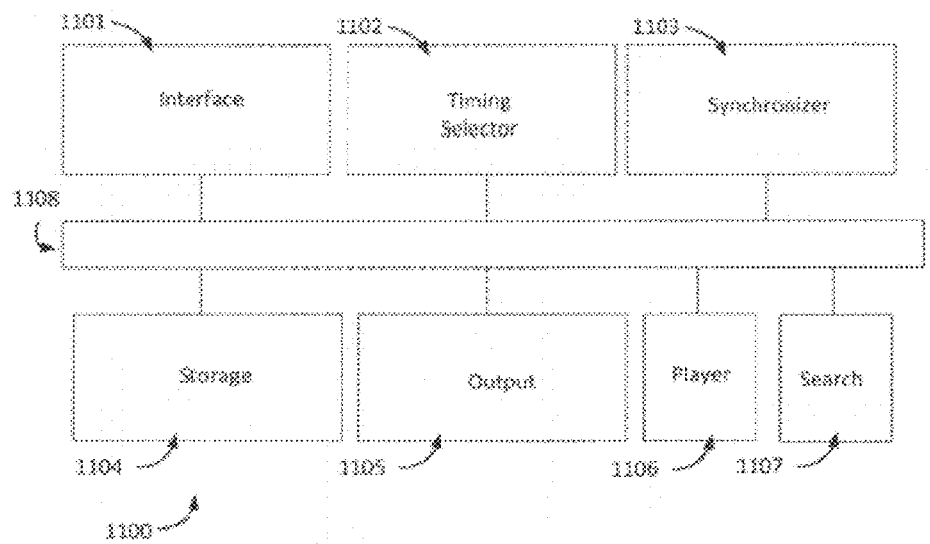
FIG. 3A is a block diagram of computer components of a multimedia player in embodiments of the present invention.

FIG. 3A is a block diagram of example computer components 1100 of the multimedia player 232 of FIG. 2A in embodiments of the present invention. FIG. 3A may also represent the computer components of multimedia players 234 and 238 of FIG. 2A. The multimedia player 232 includes an interface 1101 configured to retrieve a live media stream at a streaming media server 215 and retrieve a command manifest file at a publishing server 225. The multimedia player 232 includes a player 1106 configured to play the live media stream (received via interface 1101) and a search engine 1107 configured to locate a particular point in the live media stream. In some embodiments, the player 1106 is a HTML5 Video Player using video.js. The multimedia player 232 also includes an output module 1105 configured to display the live media stream and trigger an on-screen event from a command contained in the command manifest file (received via interface 1101). The multimedia player 232 further includes storage 1104 for saving (caching) some or the entire live media stream, information from the command manifest file, and/or calculated playback time of the live media stream.

In addition, the multimedia player 232 includes a timing selector module 1102 configured to calculate and monitor the current playback time of the live media stream based on the start time and time of currently presented frame of the live media stream. The timing selector module 1102 may also adjust the current playback time of the live media stream to a user selected time (e.g., earlier point in time) of the live media stream. The media player 232 further includes a synchronizer module 1103 configured to compare the current playback time to information retrieved (via interface 1101) from the command manifest file. The retrieved information from the command manifest file includes user initiated commands and associated command times. In embodiments, the synchronizer module 1103 is configured to compare the current playback time to the command times, and display an on-screen event from a command (i.e., re-synchronize live media stream to the on-screen event) if the clock time (e.g., server time adjusted based on offset time) is the same or greater than the playback time.

Figure 3B:
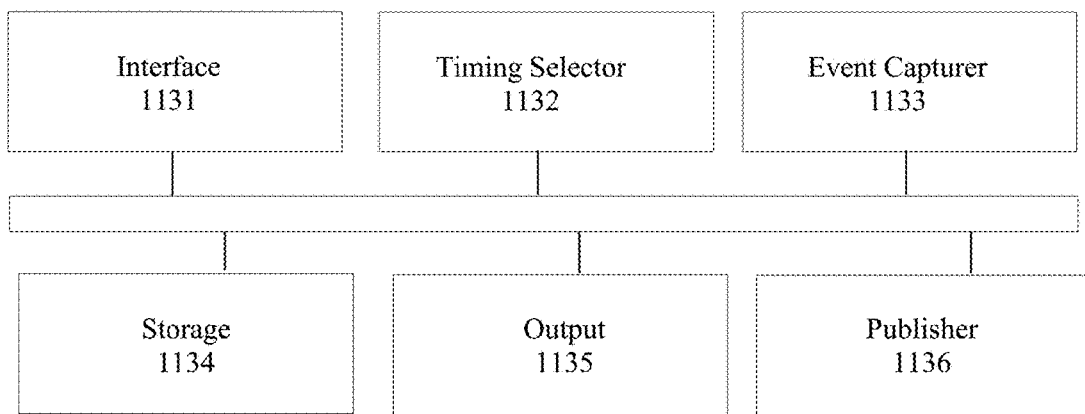
FIG. 3B is a block diagram of computer components of a publishing client in embodiments of the present invention.

FIG. 3B is a block diagram of computer components of the publishing client 220 of FIG. 2A in embodiments of the present invention. The publishing client 220 includes an interface 1131 configured to transmit messages to the publishing server 225 and receive input from a user. The publishing client 220 also includes a publisher module 136 configured to enable the user to create, update, and load media content, such as audio, video, text, or graphic image content, and trigger a stream of commands on the loaded media content (such for loaded media content of a slide presentation, selecting a new slide). The publishing client 220 further includes storage 1134 configured to store the media content, and output 1135 configured to locally display the media content to the user.

The publishing client 220 also includes a timing selector module 1132 configured to set the start time of a relevant live media stream, an offset between the start time of the live media stream and the time that the publishing client 220 initiates the stream of commands. The timing selector module 1132 may be further configured to transmit the set start time and offset to the publishing server 225 (via interface 1131). The publishing client 220 further includes an event capturer module 1133 configured to detect when a user (system or human) initiates a command to trigger a new one-screen event of the media content. The event capturer module 1133 is configured to then generate and send a notification of the user-initiated command via interface 1133 to the publishing server 225. The generated notification may include an identifier and parameters of the command, the start time of the live media stream, an adjusted offset of the start time, and the location of the live media stream. In some embodiments, the publishing client 220 may instead transmit a command time adjusted based on the set start time of the associated media stream and the offset prior to including it in the notification.

Figure 3C:
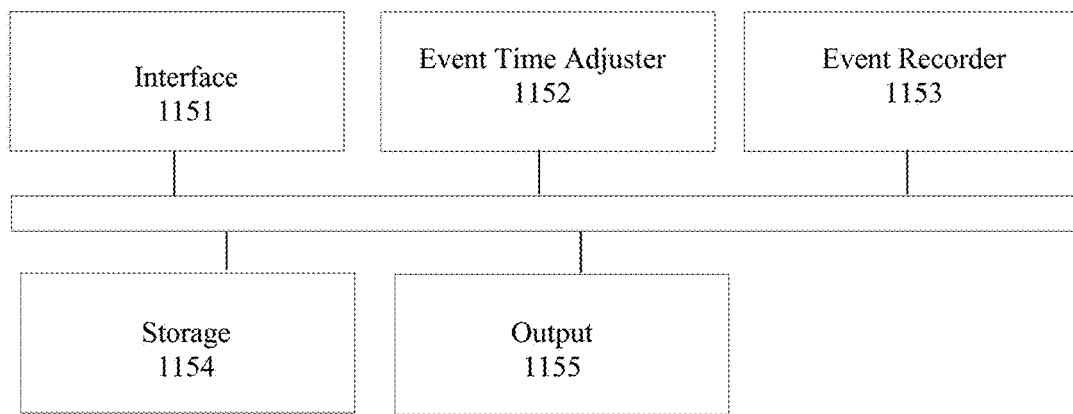
FIG. 3C is a block diagram of computer components of a publishing server in embodiments of the present invention.

FIG. 3C is a block diagram of computer components of the publishing server 225 of FIG. 2A in embodiments of the present invention. The publishing server 225 includes an interface 1151 configured to receive notification of user-initiated commands and configuration parameters (e.g., command parameters, start time and offset in relation to a relevant live media stream, and location of the live media stream) from publishing client 220, which are written to the command manifest file (e.g., FIG. 2F or FIG. 2G). The interface 1151 is also configured to receive requests from multimedia players 232, 234, 238 for receiving the command manifest file containing the user-initiated commands and associated configuration parameters. The publishing server 225 also includes storage 1154 configured to store some or the entire command manifest file, and an output module 1155 configured to output data related to the user-initiated commands contained in the command manifest file locally to a user.

The publishing client 225 also includes an event time adjuster module 1152 configured to retrieve the server clock time of a new user-initiated event contained in a received notification. The event time adjuster module is configured to adjust the server clock time based on the start time of the live media stream and offset to generate a command time. The publishing client 225 further includes an event recorder 1153 configured to retrieve the command identifier (including command parameters) of a new triggered on-screen event contained in a received notification. The event recorder module 1153 is configured to then record (log) the command identifier and associated command time (or start time, offset time, and server clock time) in the command manifest file for the media stream.

Method of Re-Synchronizing

Figure 4:
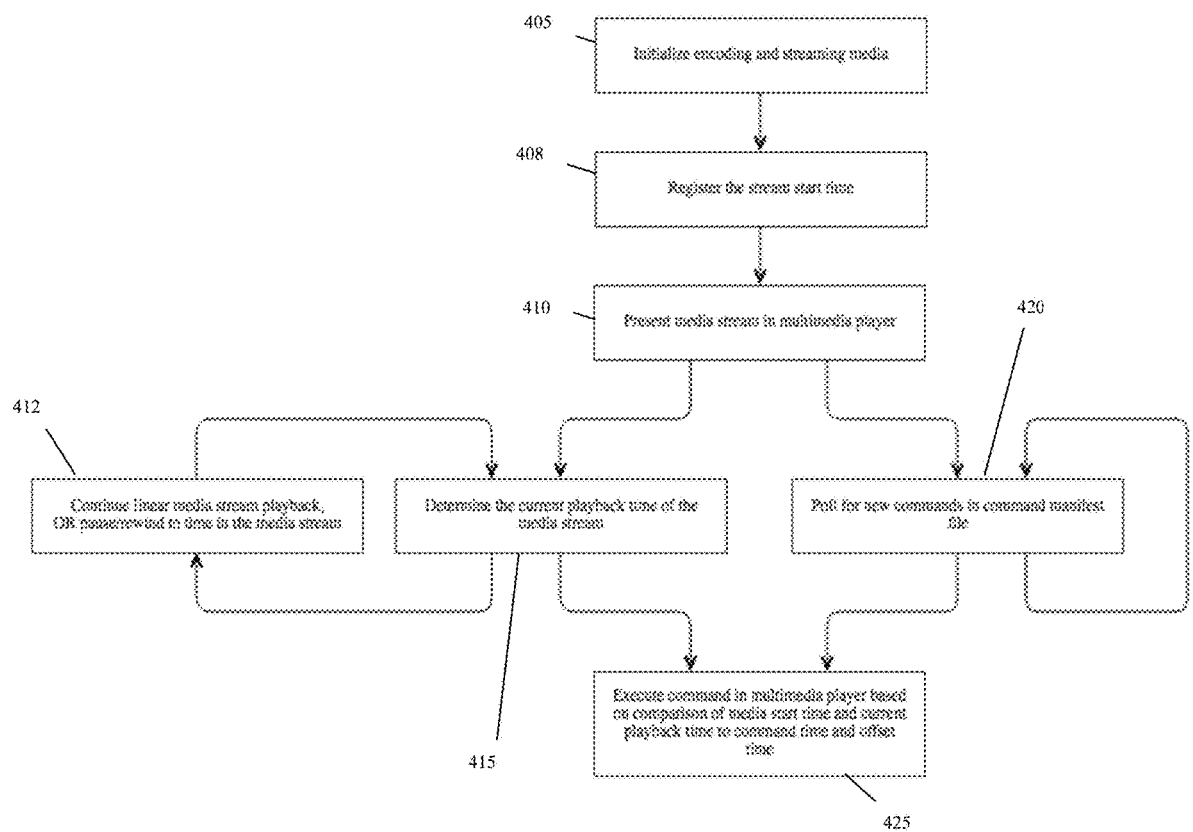
FIG. 4 is a flowchart of an example method of re-synchronizing playback of a live media stream with a stream of commands and on-screen events according to embodiments of the present invention.

FIG. 4 is a flowchart of an example method 400 of re-synchronizing playback of a live media stream with a stream of commands and on-screen events according to embodiments of the present invention. The method 400 re-synchronizes the playback of a live media stream with the execution of a stream of commands transmitted through different Internet pathways. The encoding, transmission, transcoding, distribution, download, and buffering of the live media stream may result in a latency between the time of capture and the time of playback in the multimedia players 232, 234, 238 that is different from the latency between the time a command was initiated by a publisher and the time is received by the multimedia players. For example, a particular frame of media may be captured at the media encoder 210 simultaneous to the time that a corresponding command was initiated by a publisher at the publishing client 220, but the multimedia players 232, 234, 238 may receive the command in the command stream before the corresponding frame of media is displayed during playback.

The method 400 starts at step 405 by initializing encoding and streaming media. As part of step 405, the method 400 further captures input from source devices. In some embodiments, the input is at least one of video or audio, and the source devices are at least one of: camera or microphone. The method 400 encodes the captured input to a standard media format, such as MPEG-4, H.264, and the like. The method 400 transmits the encoded input as a live media stream, using a real-time streaming protocol, to a streaming media server. The real-time streaming protocol may be one of: Real-Time Messaging Protocol (RTMP), Real-Time Streaming Protocol (RTSP), Web Real-Time Communications (WebRTC), and such.

At step 408, the method registers the start time (or zero time) of the live media stream, which may be stored in memory (cache) or to persistent storage (e.g., database). The method 400 may also register the location of the live media stream and/or the offset between the start time of the live media stream and the start time of a stream of commands and on-screen events may also be stored in memory (cache) or to persistent storage (e.g., database). The method may append the location of the live media stream and the start time of the live media stream as an initial command in a command manifest file (e.g., as shown in FIGS. 2F and 2G).

The live media stream may be received and provisioned at a streaming media server, including being divided into segments which are maintained in an output media stream playlist, such that the playlist maintains all references to older media segments while gaining new references throughout the full duration of the live media stream. Based on the initial command retrieved from the command manifest file, the method 400, at step 410, may continuously retrieve, cache, and present (by a multimedia player) the live media stream according to the playlist. In some embodiments, the live media stream is a transcoded video stream that is transmitted via HLS and played at the multimedia players by a HTML5 Video Player via a web browser in a first window or panel (as shown by 272 in FIG. 2B).

The method, at step 412, continues linear media stream playback of the live media stream or pauses/rewinds the media stream playback of the live media stream. For example, the user may select a new point in time of the live media stream using the navigation timeline 275 of FIG. 2B or select an on-screen event (e.g., thumbnail 276 of FIG. 2B) corresponding to a new point in time of the live media stream. The method 400, at step 415, determines the current playback time of the live media stream. In the situation of consistent linear media stream playback, the determined current playback time is the time of the current last frame of the live media stream stored at the streaming media server (e.g., in a media segment referenced by the media stream playlist). In the situation where the media stream playback is paused/rewound, the determined current playback time is the selected new point in time of the live media stream time plus the elapsed time since restarting the live media stream at the selected new point in time. In embodiments, the playback time is the number of milliseconds between the starting point of the media and the currently presented frame of the live media stream. In an example embodiment, the method 400 (step 415) determines the current playback time by polling the API of the HTML5 Video Player via the web browser.

The method also registers a stream of user-initiated commands that are appended to the end of the command manifest file (e.g., as shown in FIGS. 2F and 2G) together with a calculated command time. When the method 400 registers a new user-initiated command (e.g., sequencing or selecting a new slide, or displaying a slide image, a notification message, an advertisement, a statistic, a sporting event score, a caption, a translation, a video overlay, a question, a social media post, a chat or text message, a survey, a live web page, a footnote, a thumbnail, a chapter title, and such) of the stream, the method 400 notifies a publishing server of the new user-initiated command. The method may include in the notification an identifier of the new user-initiated command (e.g., an identifier of the new sequence or selected slide of a slide presentation) or the command type and parameter. The method may also include in the notification the clock time that the new user-initiated command was initiated or the publishing server may determine the server clock time based on the time the server received the notification. The method may determine the command time for the registered command based on adjusting the clock time relative to the registered start time of the live media stream or registered offset.

The method 400, at step 420, polls the command manifest file and retrieves the command identifier (and/or command type and command parameter), associated command time (e.g., server timestamp), and offset time of a user-initiated command (or commands) corresponding to the current playback time of the live media stream. The method 400, at step 425, executes the retrieved user-initiated command in the multimedia player based on comparison of the start time of the live media stream, current playback time (determined in step 215) to command time and offset time. The execution triggering the on-screen event associated with the new user-initiated command at the multimedia player (e.g., proceed to the new selected slide), simultaneous to and in synchronization with the playback of the live media stream 272 in a window or panel (as shown by 280 in FIG. 2B). In some embodiments, if the sum of the start time and the current playback time of a particular command is greater than or equal to the sum of the command time and the offset time of the command, and less than the sum of the command time and offset time of the next command in the command stream (in command manifest file), the multimedia player retrieves and executes the particular user-initiated command. Otherwise, the method 400 may wait to execute the particular command until the calculation of a future playback time (if the playback time for the particular command has not already past).

Timeline of Re-Synchronizing Media Stream to Commands

Figure 5A:
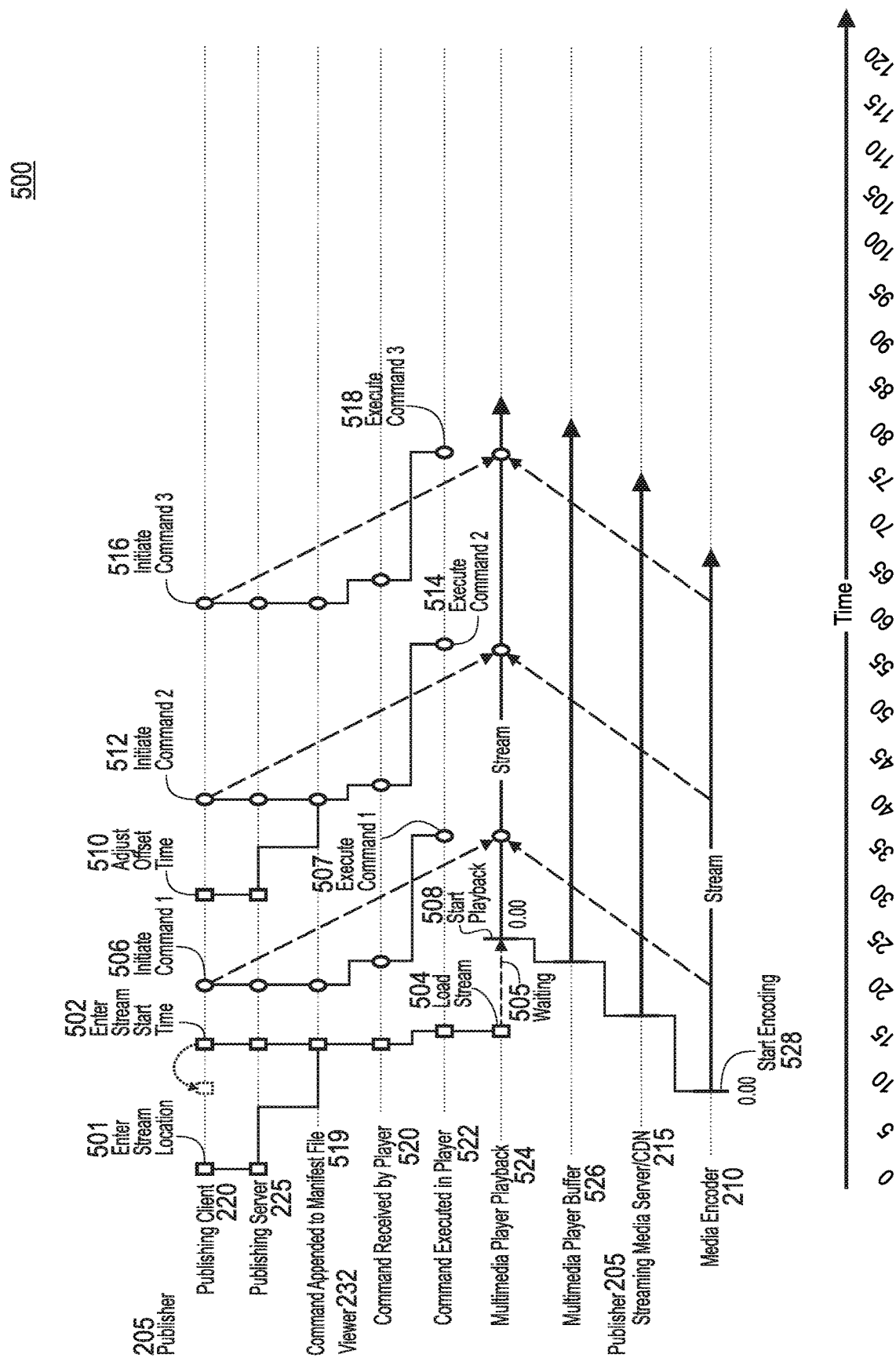
FIG. 5A is a sequence diagram of the timeline of re-synchronizing the playback of a live media stream to a stream of commands and on-screen events in embodiments of the present invention.

FIG. 5A is a timeline 500 of re-synchronizing the playback of a live media stream to a stream of commands and on-screen events in embodiments of the present invention. The live media stream to a stream of commands and on-screen events of the timeline are transmitted through different Internet pathways to the multimedia player 232. The timeline 500 begins at time 0, when a user or system enters 501 the location of the live media stream at the publishing client 220 of the publisher 205, which is communicated to the publishing server 225. At time 10, the media encoder 210 starts 528 encoding the captured input from source devices to a media format and transmitting the encoded input as a stream, using a real-time streaming protocol, to a streaming media server 215. At time 15, the streaming media server 215 starts receiving and transcoding the media stream to a live streaming format compatible with content delivery, and either hosts the live output media stream or transmits the live output media stream to a Content Distribution Network (CDN) for delivery. At time 15, the streaming media server/CON 215 starts loading 504 the stream, the stream waits 505 until the multimedia player 232 initializes 524 and buffers 526 the stream for playback and starts playback 508 of the stream at time 23.

Also at time 15, a user or system enters 502 the start time of the live media stream and offset time from the start time for initiating stream of commands and on-screen events at the publishing client 220, which is communicated to the publishing server 225. The publishing server 225 may append the location of the live media stream and the start time of the live media stream as an initial command in command manifest file (e.g., as shown in FIGS. 2F and 2G). The multimedia player/viewer 232 receives the initial command from the command manifest file. At time 17, the publishing server 225 executes the command in the multimedia player 232, and based on the information in the command (e.g., live media stream location) loads the output live media stream from the streaming media server 215 or CDN and starts playback of the output live media stream.

At time 21, Command 1 is initiated 506 by a user triggering an on-screen event at the publishing client 220, which is communicated to the publishing server 225. The publishing server 225 appends 519 the Command 1 to the command manifest file along with a server clock time for Command 1. At time 23, the multimedia player/viewer 232 receives 520 Command 1 from the command manifest file. As the sum of the live media stream start time and the current playback time of the output live media stream is not greater than or equal to the sum of server clock time that Command 1 was received, plus the offset time of Command 1, the multimedia player 232 waits until time 37 to execute 507 the Command 1 for playback 522 of the associated on-screen event (re-synchronized to the playback of the live media stream). At time 30, a user or system adjusts the offset time 510, which is communicated to the publishing server 225. The publishing server 225 appends the adjusted offset time as a new command in the command manifest file.

At time 41, Command 2 is initiated 512 by a user triggering an on-screen event at the publishing client 220, which is communicated to the publishing server 225. The publishing server 225 appends 519 the Command 2 to the command manifest file along with a server clock time for Command 2. At time 43, the multimedia player/viewer 232 receives 520 Command 2 from the command manifest file. As the sum of the live media stream start time and the current playback time of the output live media stream is not greater than or equal to the sum of server clock time that Command 1 was received, plus the adjusted offset time of Command 2, the multimedia player 232 until time 58 to execute 514 the Command 2 for playback 522 of the associated on-screen event (re-synchronized to the playback of the live media stream).

Similarly, at time 62, Command 3 is initiated 516 by a user triggering an on-screen event at the publishing client 220, which is communicated to the publishing server 225. The publishing server 225 appends the Command 3 to the command manifest file along with a server clock time for Command 3. At time 64, the multimedia player/viewer 232 receives Command 3 from the command manifest file. As the sum of the live media stream start time and the current playback time of the output live media stream is not greater than or equal to the sum of server clock time that Command 3 was received, plus the adjusted offset time of Command 3, the multimedia player 232 until time 77 to execute 518 the Command 3 for playback 522 of the associated on-screen event (re-synchronized to the playback of the live media stream).

Timeline of Re-Synchronizing Commands to Rewound Media Stream Time

Figure 5B:
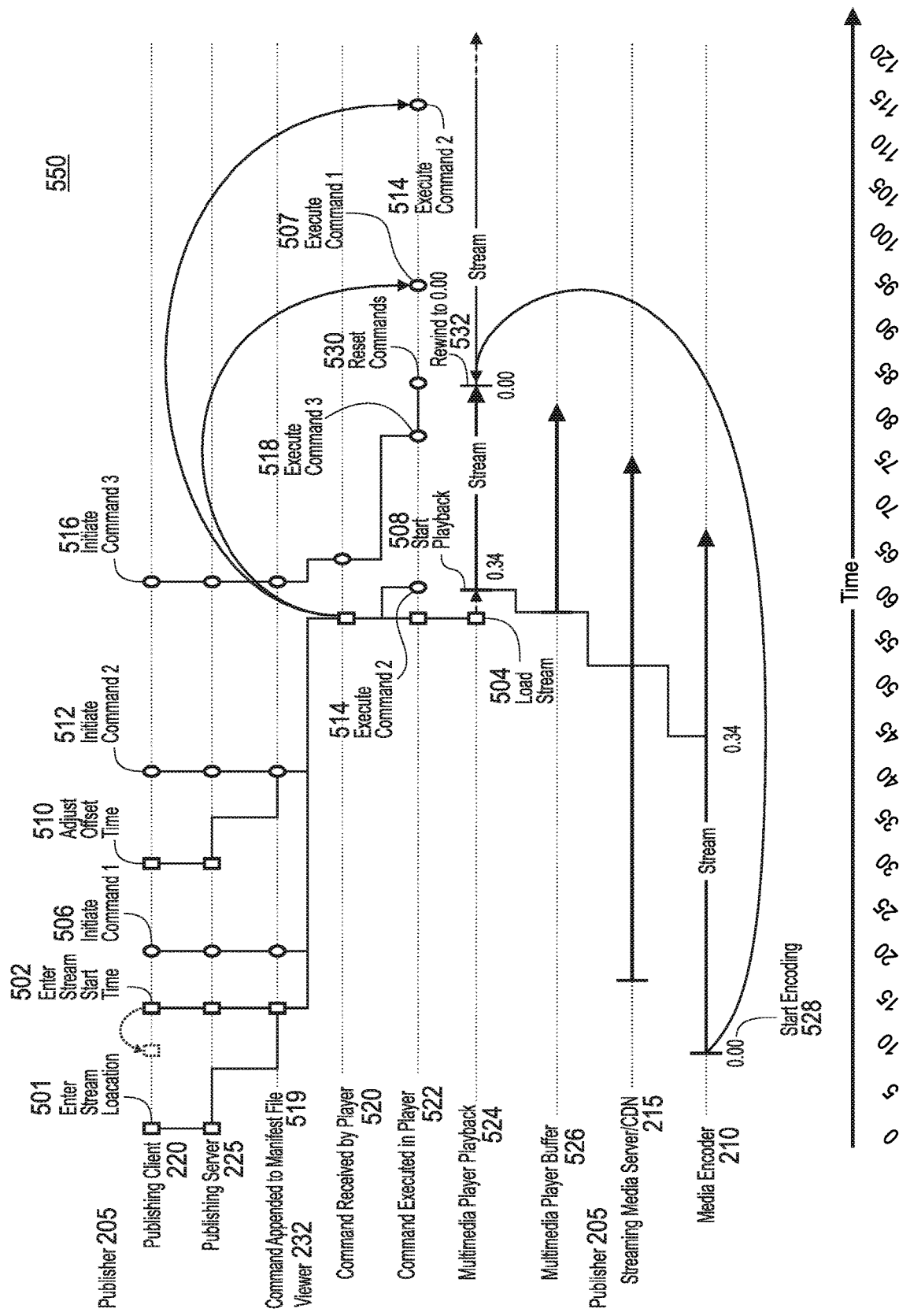
FIG. 5B is another sequence diagram of the timeline of re-synchronizing a stream of commands to a selected playback time of a live media stream in embodiments of the present invention.

FIG. 5B is second example of a timeline 550 of re-synchronizing the playback of a live media stream to a stream of commands and on-screen events in embodiments of the present invention that illustrates the DVR-style navigation capabilities of the present invention.

In this example, the timelines for the publishing client 220, publishing server 225, media encoder 210, and streaming media server/CDN 215 remain the same as in FIG. 5A. The difference between FIG. 5A and FIG. 5B is that in FIG. 5B, the multimedia player 232 initializes at time 60, after the live media stream has been streaming from the media encoder 210 for a period of time, and several commands (Commands 1, 2, and 3) have already been imitated/dispatched 506, 512, and 516 by the publishing client 220. This represents the experience of a viewer who arrives late to a live event (e.g., webcast presentation) that is already in progress.

When the multimedia player 232 initializes and starts playback 508 at time 60, the multimedia player 232 loads the command manifest file, which at this time already includes the location of the live media stream, as well as the first command and second command that have been dispatched/initiated 506, 512 by the publishing client 225. The multimedia player 232 loads 504 the live stream, which now is already in progress, and starts playing 508 from playback time 0:34. Based on this current playback time, the multimedia player 232 performs the calculation to determine that Command 1 has already passed and instead Command is executed 514 immediately to accurately reflect the re-synchronized state of the presentation. At time 77, the multimedia player 232 executes 518 Command 3, as it did in the example in FIG. 5A. At time 84, the viewer user interacts with the multimedia player and instructs it to "rewind" 532 to playback time 0:00, which is the start of the media stream. The multimedia player 232 detects this change in playback time and immediately resets 530 to its default initial state in which no commands have yet been executed. As playback continues, the multimedia player 232 now executes 507 Command 1 at time 95, and executes 514 Command 2 for a second time at time 115.

While example embodiments have been particularly shown and described, it will be understood by those skilled in the art that various changes in form and details may be made therein without departing from the scope of the embodiments encompassed by the appended claims.

What is claimed is:

1. A computer system for re-synchronizing playback of a live media stream with execution of a stream of out-of-band commands, the system comprising:
   a publishing client operated by a publisher user, the publishing client configured to:
      prompt the publisher user to enter: location of an output media stream, (ii) start time at which a media encoder began capturing and encoding an input, and (iii) an offset time adjusting the start time at the publishing client;
      transmit the location of the output media stream, the start time, and the offset time to a publishing server;
      enable the publisher user to initiate new commands at particular times, the new user-initiated commands being relevant to the input simultaneously captured and encoded by the media encoder; and
      transmit the new user-initiated commands to the publishing server;
   the publishing server coupled to the publishing client, the publishing server configured to:
      receive the location of the output media stream, the start time, and the offset time from the publishing client;
      generate and maintain a command manifest file;
      write the received location of the output media stream and the start time as a first command in the command manifest file;
      receive the new user-initiated commands from the publishing client;
      append the new user-initiated commands to the command manifest file as the user-initiated commands are received from the publishing client, each new received user-initiated command being appended to the end of the command manifest file, wherein each new received user-initiated command being appended with (i) a server clock time indicating time the new user-initiate command is received at the publishing server, (ii) the offset time, (iii) a command type, and (iv) a command parameter for executing the command; and
      at least one of: host the command manifest file or transmit the command manifest file to a Content Distribution Network (CDN) for delivery to a multimedia player;
   a multimedia player running on a client device of a viewer user, the multimedia player configured to:
      retrieve the command manifest file from at least one of: the publishing server or the CDN;
      parse the location of the output media stream from the retrieved command manifest file, the parsed location being used to load and buffer the output media stream for presentation to the viewer user;
      start playback of the output media stream;
      monitor current playback time of the output media stream; and
      determine whether to execute a new user-initiated command to display in a user interface of the multimedia player by polling the command manifest file based on the current playback time; and
   the multimedia player further being configured to perform at least one of:
      execute the new user-initiated command including displaying on the user interface at least one of: a slide image, a notification message, an advertisement, a statistic, a sporting event score, a caption, a translation, a video overlay, a question, a social media post, a chat or text message, a survey, a live web page, a footnote, a thumbnail, and a chapter title;
      append each new user-initiated command to the end of the command manifest file as one of: a new line of text or a data object; and
      process the command manifest file in a text format that is one of: CSV, JSON, or XML.

2. The system of claim 1, further comprising:
a media encoder logically independent of the publishing client and the publishing server, the media encoder operated by the publisher user simultaneous to operation of the publishing client, the media encoder configured to:
   capture input from source devices;
   encode the captured input to a media format; and
   transmit the encoded input to a streaming media server as an input media stream using a real-time streaming protocol;
the streaming media server coupled to the media encoder, the streaming media server configured to:
   receive the input media stream from the media encoder;
   transcode the media stream to a live streaming format compatible with content delivery, the transcoded media stream being the output media stream, the transcoded media stream being stored in media segments of a target length on the streaming media server at the location specified in the command manifest file;
   generate and maintain a media stream playlist referencing the stored media segments; and
   at least one of: host the output media stream or tra nsmit the output media stream to a Content Distribution Network (CDN) for delivery to the multimedia player.

3. The system of claim 2, wherein at least one of:
the media encoder is implemented as one of a software-based media encoder, a hardware-based media encoder, or a cloud-based media encoder;
the media encoder is one of: Telstra Wirecast, Adobe Live Media Encoder, NewTek TriCaster, Zoom Video Webinar, or Pexip Infinity;
the captured input is at least one of video and audio, and the source devices are at least one of: camera or microphone; and
the media format is a standard format that is one of: MPEG-4 and H.264.

4. The system of claim 2, wherein at least one of:
the real-time streaming protocol is one of: Real-Time Messaging Protocol (RTMP), Real-Time Streaming Protocol (RTSP), or Web Real-Time Communications (WebRTC);
the streaming media server is one of: Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental Media Live, Wowza Streaming Cloud; and
transcoding the media streaming using a Hypertext Transfer Protocol (HTTP) protocol that is one of: HTTP Live Streaming (HLS) or MPEG-DASH.

5. The system of claim 2, wherein the generated media stream playlist maintains references to older media segments of the transcoded media stream, while gaining references to new media segments, throughout full duration of the input media stream.

6. The system of claim 1, wherein the multimedia player runs in one of: a web browser or a mobile application on the client device.

7. The system of claim 1, wherein the current playback time is calculated as number of milliseconds between the start time and time of a currently presented frame of the output media stream.

8. The system of claim 1, wherein determining to display the new user-initiated command from the command manifest file at the user interface of the multimedia player:
if the sum of the start time and the current playback time is (a) greater than or equal to the sum of server clock time of the new user-imitated command, plus the offset time of the new user-initiated command, and (b) less than the sum of server clock time of a next immediate new user-initiated command in the command manifest file, plus offset time of the next immediate user-initiated command.

9. A computer-implemented method of re-synchronizing playback of a live media stream with execution of a stream of out-of-band commands, the method comprising:
at a publishing client operated by a publisher user:
   prompting the publisher user to enter: location of an output media stream, (ii) start time at which a media encoder began capturing and encoding an input, and (iii) an offset time adjusting the start time at the publishing client;
   transmitting the location of the output media stream, the start time, and the offset time to a publishing server;
   enabling the publisher user to initiate new commands at particular times, the new user-initiated commands being relevant to the input simultaneously captured and encoded by the media encoder; and
   transmitting the new user-initiated commands to the publishing server;
at the publishing server coupled to the publishing client:
   receiving the location of the output media stream, the start time, and the offset time from the publishing client;
   generating and maintaining a command manifest file;
   writing the received location of the output media stream and the start time as a first command in the command manifest file;
   receiving the new user-initiated commands from the publishing client;
   appending the new user-initiated commands to the command manifest file as the user-initiated commands are received from the publishing client, each new received user-initiated command being appended to the end of the command manifest file, wherein each new received user-initiated command being appended with (i) a server clock time indicating time the new user-initiate command is received at the publishing server, (ii) the offset time, (iii) a command type, and (iv) a command parameter for executing the command; and
   at least one of: hosting the command manifest file or transmitting the command manifest file to a CDN for delivery to a multimedia player;
at a multimedia player running on a client device of a viewer user:
   retrieving the command manifest file from at least one of: the publishing server or the CDN;
   parsing the location of the output media stream from the retrieved command manifest file, the parsed location being used to load and buffer the output media stream for presentation to the viewer user;
   starting playback of the output media stream;
   monitoring current playback time of the output media stream;
   determining whether to execute a new user-initiated command to display in a user interface of the multimedia player by polling the command manifest file based on the current playback time; and
   further including, at least one of:
   executing the new user-initiated command including displaying on the user interface at least one of: a slide image, a notification message, an advertisement, a statistic, a sporting event score, a caption, a translation, a video overlay, a question, a social media post, a chat or text message, a survey, a live web page, a footnote, a thumbnail, and a chapter title;
append each new user-initiated command to the end of the command manifest file as one of: a new line of text or a data object; and
process the command manifest file in a text format that is one of: CSV, JSON, or XML.

10. The method of claim 9, further comprising:
at a media encoder logically independent of the publishing client and the publishing server:
capturing input from source devices;
encoding the captured input to a media format; and
transmitting the encoded input to a streaming media server as an input media stream using a real-time streaming protocol;
at the streaming media server coupled to the media encoder:
receiving the input media stream from the media encoder;
transcoding the media stream to a live streaming format compatible with content delivery, the transcoded media stream being the output media stream, the transcoded media stream being stored in media segments of a target length on the streaming media server at the location specified in the command manifest file;
generating and maintaining a media stream playlist referencing the stored media segments; and
at least one of: hosting the output media stream or transmitting the output media stream to a Content Distribution Network (CDN) for delivery to the multimedia player.

11. The method of claim 10, wherein at least one of:
the media encoder is implemented as one of a software-based media encoder, a hardware-based media encoder, or a cloud-based media encoder;
the media encoder is one of: Telstra Wirecast, Adobe Live Media Encoder, NewTek TriCaster, Zoom Video Webinar, or Pexip Infinity;
the input is at least one of video and audio, and the source devices are at least one of: camera or microphone; and
the media format is a standard format that is one of: MPEG-4 and H.264.

12. The method of claim 10, wherein at least one of:
the real-time streaming protocol is one of: Real-Time Messaging Protocol (RTMP), Real-Time Streaming Protocol (RTSP), or Web Real-Time Communications (WebRTC);
the streaming media server is one of: Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental Media Live, Wowza Streaming Cloud; and
transcoding the media streaming using a Hypertext Transfer Protocol (HTTP) protocol that is one of: HTTP Live Streaming (HLS) or MPEG-DASH.

13. The method of claim 10, wherein the generated media stream playlist maintains references to older media segments of the transcoded media stream, while gaining references to new media segments, throughout full duration of the input media stream.

14. The method of claim 9, wherein the multimedia player runs in one of: a web browser or a mobile application on the client device.

15. The method of claim 9, wherein the current playback time is calculated as number of milliseconds between the start time and time of a currently presented frame of the output media stream.

16. The method of claim 9, wherein determining to display the new user-initiated command from the command manifest file at the user interface of the multimedia player:
if the sum of the start time and the current playback time is (a) greater than or equal to the sum of server clock time of the new user-imitated command, plus the offset time of the new user-initiated command, and (b) less than the sum of server clock time of a next immediate new user-initiated command in the command manifest file, plus offset time of the next immediate user-initiated command.

17. A computer program product comprising a non-transitory computer-readable medium storing instructions for re-synchronizing playback of a live media stream with execution of a stream of out-of-band commands, cause the processor to:
at a publishing client operated by a publisher user:
prompt the publisher user to enter: location of an output media stream, (ii) start time at which a media encoder began capturing and encoding an input, and (iii) an offset time adjusting the start time at the publishing client;
transmit the location of the output media stream, the start time, and the offset time to a publishing server;
enable the publisher user to initiate new commands at particular times, the new user-initiated commands being relevant to the input simultaneously captured and encoded by the media encoder; and
transmit the new user-initiated commands to the publishing server;
at the publishing server coupled to the publishing client:
receive the location of the output media stream, the start time, and the offset time from the publishing client;
generate and maintaining a command manifest file;
write the received location of the output media stream and the start time as a first command in the command manifest file;
receive the new user-initiated commands from the publishing client;
append the new user-initiated commands to the command manifest file as the user-initiated commands are received from the publishing client, each new received user-initiated command being appended to the end of the command manifest file, wherein each new received user-initiated command being appended with (i) a server clock time indicating time the new user-initiate command is received at the publishing server, (ii) the offset time, (iii) a command type, and (iv) a command parameter for executing the command; and
at least one of: host the command manifest file or transmit the command manifest file to a CDN for delivery to a multimedia player;
at a multimedia player running on a client device of a viewer user:
retrieve the command manifest file from at least one of: the publishing server or the CDN;
parse the location of the output media stream from the retrieved command manifest file, the parsed location being used to load and buffer the output media stream for presentation to the viewer user;
start playback of the output media stream;

monitor current playback time of the output media stream; and determine whether to execute a new user-initiated command to display in a user interface of the multimedia player by polling the command manifest file based on the current playback time.

\* \* \* \* \*